(12) United States Patent
Ujikane et al.

(10) Patent No.: US 6,909,847 B2
(45) Date of Patent: Jun. 21, 2005

(54) CAMERA WITH BUILT-IN STROBE

(75) Inventors: Yukikazu Ujikane, Saijo (JP); Jun Saiki, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/667,498

(22) Filed: Sep. 23, 2003

(65) Prior Publication Data

US 2004/0071459 A1 Apr. 15, 2004

(30) Foreign Application Priority Data

Oct. 9, 2002 (JP) ........................................ 2002-296193

(51) Int. Cl.[7] .............................................. G03B 15/03
(52) U.S. Cl. ...................................................... 396/178
(58) Field of Search ................................. 396/177, 178

(56) References Cited

U.S. PATENT DOCUMENTS 4,910,542 A * 3/1990 Yamamoto et al. ......... 396/165
5,055,866 A * 10/1991 Takebayashi ............... 396/175
5,245,374 A * 9/1993 Hosokawa et al. ......... 396/177

FOREIGN PATENT DOCUMENTS

| JP | 10-228050 | 8/1998 |
| JP | 10228050 A | 8/1998 |

* cited by examiner

Primary Examiner—David M. Gray
(74) Attorney, Agent, or Firm—Parkhurst & Wendel, L.L.P.

(57) ABSTRACT

The present invention provides a camera with a built-in strobe which can reduce its whole size, while having a pop-up mechanism that enables a strobe casing attached to a camera body to be shiftable. The camera is provided with a camera body (2), a support unit (3) which has a first turning section (11) and a second turning section (12) and which is turnably supported on the camera body (2) through the first turning section (11), a strobe casing (4) turnably supported at one side thereof on the support unit (3) through the second turning section (12), a first engaging section (15) for engaging the support unit (3) at a second position, and a second engaging section (16) for engaging the strobe casing (4) at the second position.

6 Claims, 22 Drawing Sheets

CAMERA WITH BUILT-IN STROBE

TECHNICAL FIELD

The present invention relates to a camera with a built-in strobe and, more particularly, to a camera with a built-in strobe having a pop-up mechanism which enables a strobe casing attached to a camera body to be shiftable between a first position and a second position.

BACKGROUND ART

In digital still cameras and compact cameras using film, those with a built-in strobe containing a strobe casing having a strobe light-emitting section that throws in fill flash for taking photographs have been in wide use.

These cameras with a built-in strobe are divided into two types: one which performs the opening/closing operation of a lens barrier; and the other which has a pop-up mechanism that enables the strobe casing attached to a camera body to be shiftable between a first position and a second position.

In general, the latter type of camera with a built-in strobe having the pop-up mechanism has a problem that the provision of the pop-up mechanism increases the size of the camera as a whole. Cameras with a built-in strobe that have been contrived in an effort to solve this problem are shown, e.g., in Japanese Unexamined Patent Publication No. 11-327008 (1999) (hereinafter, referred to as Document 1) and Japanese Unexamined Patent Publication No. 10-228050 (1998) (hereinafter, referred to as Document 2).

The camera with a built-in strobe shown in Document 1 will be described with reference to FIGS. 19(a), 19(b) and 20. FIG. 19(a) shows a state where a strobe casing 102 is at a housing position; FIG. 19(b) shows a state where the strobe casing 102 is at a projecting position; and FIG. 20 is an exploded perspective view of the strobe casing 102 and its adjacent components.

As shown in these figures, a support lever 101 for supporting the strobe casing 102 has a first turning section 101a and a second turning section 101b, and is turnably supported on a camera body 100 through the first turning section 101a. The strobe casing 102 containing a strobe light-emitting section 102a therein has a strobe support unit 102b thereunder, which is turnably supported at the second turning section 101b of the support lever 101 so as to be rotatable with respect to the support lever 101. The strobe light-emitting section 102a throws in flash light from a surface orthogonal to the turning axes 103, 104 of the first turning section 101a and the second turning section 101b out of the surfaces of the strobe casing 102 which is shaped approximately rectangular parallelepiped. In the housing position, the strobe casing 102 is completely housed in the camera body 100.

FIG. 19(b) shows the state where the strobe casing 102 is projected from the camera body 100 and the strobe light-emitting section 102a is ready to throw in flash light. As shown in FIG. 19(b), even in the projected condition, the strobe casing 102 is not completely exposed from the camera body 100, and the part of the strobe casing 102 that is in the vicinity of the strobe support unit 102b remains housed in the camera body 100.

The camera with a built-in strobe according to Document 1 realizes a reduction in the space taken up by the stroboscope as a whole.

Document 1 does not refer to the arrangement of a wiring section for electrically connecting the strobe light-emitting section 102a and the camera body 100; however, the present applicant assumes that the wiring section is arranged near the strobe support unit 102b. The reason for the assumption is that if the wiring section is arranged somewhere other than the vicinity of the strobe support unit 102b, then the wiring section is exposed when the strobe casing 102 is in the projecting position, which may damage the wiring section. It is also possible to assume that the strobe casing 102 is designed not to be completely exposed outside from the camera body 100 when the strobe casing 102 is in the projecting position for the purpose of avoiding the exposure of the wiring section.

The camera with a built-in strobe disclosed in Document 2 has the structure shown in FIGS. 21, 22(a) and 22(b).

As shown in these figures, the camera with a built-in strobe includes a strobe block 201 which has an approximately triangular shape when viewed from a side and is projected from and withdrawn to a top surface of the camera body 200 as desired, and the right and left side plate parts of the strobe block 201 are supported by a pair of supporting link mechanisms 202 in such a manner as to be projected and withdrawn as desired. The pair supporting link mechanisms 202 each comprises: a drive lever 203 which receives the driving force of an unillustrated torsion spring via plural gears; a C-shaped link 204 which is disposed a little behind the drive lever 203; and a L-shaped link 205 which links the drive lever 203, the C-shaped link 204 and the strobe block 201. One end part 203a of the drive lever 203 and one end part 204a of the C-shaped link 204 are turnably attached on the strobe supporting member 205 fixed in the prescribed position of the camera body 200. The other end part 203b of the drive lever 203 is turnably linked with the portion which becomes the bottom end part of the strobe block 201 when the strobe block 201 is projected; a center part 205a of the L-shaped link 205 is linked with the drive lever 203; one end part 205b of the L-shaped link 205 is linked with the other end part of the C-shaped link 204; and the other end part 205c of the L-shaped link 205 is linked with the strobe block 201.

When the strobe block 201 is shifted from the position to be housed in the top surface of the camera body 200 shown in FIG. 22(b) to the projecting position shown in FIG. 22(a), a strobe lens 201a of the strobe block 201 turns from diagonally below towards the front, while the strobe block 201 projects nearly upwards. As shown in FIG. 21, in the center of the front surface of the camera body 200 is provided a lens barrel 206 containing a zoom lens. As shown in FIG. 22(b), in this camera with a built-in strobe, the strobe block 201 is designed to be housed between a battery room 207 and a front surface 200a of the camera body 200.

The camera with a built-in strobe of Document 2 realizes a reduction in the space taken up by the stroboscope as a whole.

Document 2 does not also refer to the arrangement of the wiring section for electrically connecting the strobe light-emitting section of the strobe block 201 and the camera body 100; however, the present applicant assumes that the wiring section is arranged near e.g., the supporting link mechanisms 202 so that the wiring section can be prevented from being exposed outside from the camera body 200 when the strobe block 201 is in the projecting position.

Document 1, however, has a problem that the camera with a built-in strobe can not be downsized any more by reducing the space taken up by the whole stroboscope because of the provision of the strobe support unit 102b turnably supported through the second turning section 101b of the support lever 101 under the strobe casing 102.

On the other hand, Document 2 has the supporting link mechanisms 202 each including three links (the drive lever 203, the C-shaped link 204 and the L-shaped link 205) and plural gears, and as shown in FIG. 22(b), the C-shaped links 204 and other components project downwards from the storage place of the strobe block 201 when they are housed. This structure has the same problem that the camera with a built-in strobe can not be downsized by reducing the space taken up by the whole stroboscope. If the structure of Document 2 is applied to a camera having a strobe block which is shaped approximately rectangular parallelepiped, the strobe block projects backwards or upwards, making it hard to be housed properly.

In order to prevent the flash light of the strobe light-emitting section 102a shown in FIGS. 19 and 20 and the light-emitting section of the strobe block 201 shown in FIGS. 21 and 22 from being reflected diffusely by the presence of the lens barrel or other components in the center of the front surface of the camera bodies 100 and 200, it is preferable that the strobe casing 102 and the strobe block 201 are set as far a position from the camera bodies 100 and 200 as possible when projected. However, in this camera with a built-in strobe, the support lever 101, the drive lever 203 and the C-shaped link 204 are provided inside the camera bodies 100 and 200, which makes it difficult to increase the distance from the camera bodies 100 and 200 to the strobe casing 102 and the strobe block 201 when in the projecting position.

In both cameras with a built-in strobe, the projecting position is set almost right above the housing position, which also causes the flash light of the strobe light-emitting section 102a and the light-emitting section of the strobe block 201 to be reflected diffusely by the presence of the lens barrel or other components in the center of the front surface of the camera bodies 100 and 200.

The strobe casing 102 and the strobe block 201 are not completely exposed from the camera bodies 100 and 200 when projected in an effort to prevent the exposure of the wiring section. This is another reason why it is difficult to set the strobe casing 102 and the strobe block 201 at a high position when projected.

In both cameras with a built-in strobe, the strobe light-emitting section 102a and the strobe block 201 are designed to face straight ahead when in the projecting position, and the flash light from the light-emitting section is applied directly to the subject of a photograph. This sometimes causes the formation of a shadow behind the subject of a photograph when the light flashes, and it has been impossible to reduce this inconvenience.

DISCLOSURE OF THE INVENTION

The present invention has been contrived to solve these conventional problems, and its object is to provide a camera with a built-in strobe which can reduce its whole size, while having a pop-up mechanism that enables a strobe casing attached to a camera body to be shiftable between a first position and a second position.

Another object of the present invention is to provide a camera with a built-in strobe which can reduce the diffused reflection of the emitted light that is caused by the presence of the lens barrel or other components in the center of a front surface of the camera body.

Still another object of the present invention is to provide a camera with a built-in strobe which can reduce the inconvenience of forming a shadow behind a subject of a photograph when the strobe light flashes.

A camera with a built-in strobe according to the first aspect of the present invention includes a camera body, a support unit having a first turning section and a second turning section, the support unit being turnably supported on the camera body through the first turning section, a strobe casing turnably supported at one side thereof on the support unit through the second turning section, the strobe casing containing a strobe light-emitting section and being shiftable between a first position and a second position, a first engaging section for engaging the support unit at the second position, and a second engaging section for engaging the strobe casing at the second position, wherein the first turning section is located to position itself toward the front of the support unit when the strobe casing is at the first position, and the second turning section is located to position itself toward the rear of the support unit when the strobe casing is at the first position and is located to position itself toward the rear of the strobe casing when the strobe casing is at the first position and the second position.

According to this structure, the support unit turnably supports one side of the strobe casing through the second turning section, thereby reducing a space necessary to provide a portion used to turnably support the strobe casing. Furthermore, when the strobe casing is at the first position, the first turning section is located to position itself toward the front of the support unit and the second turning section is located to position itself toward the rear of the support unit. This enables the strobe casing and the support unit to be housed compactly at the first position, thereby miniaturizing the camera as a whole. In addition, the second turning section is located to position itself toward the rear of the strobe casing when the strobe casing is at the first and second positions, which results in the strobe casing being shifted not only upwards but also forwards when projected to the second position. This leads to reduction in diffused reflection of a flash light which is caused by the presence of a lens barrel and other components in the center of the front surface of the camera body.

According to the second aspect of the invention, the strobe casing is approximately rectangular parallelepiped in shape, and the support unit is designed to cover side surfaces and bottom surface of the strobe casing when the strobe casing is at the first position.

In this structure, when the strobe casing is at the first position, the support unit is arranged in such a manner as to cover the side surfaces and bottom surface of the strobe casing, which enables the support unit and the strobe casing to be housed in an extremely small space efficiently in such a manner as to be closely arranged to each other.

According to the third aspect of the invention, the support unit is formed of two plates stuck to each other, and a wiring section for electrically connecting the strobe light-emitting section and the camera body is sandwiched between the two plates.

In this structure, the wiring section is not exposed when the strobe casing is at the second position, which makes it possible to prevent the wiring section from being damaged by coming into contact with other components.

According to the fourth aspect of the invention, the first turning section is located to position ahead of the strobe casing when the strobe casing is at the first position.

In this structure, it becomes unnecessary to provide a portion used to turnably support the support unit below the strobe casing, which contributes to a size reduction of the camera with a built-in strobe.

According to the fifth aspect of the invention, the support unit and the strobe casing are provided in a top-surface part of the camera body, and when the strobe casing is at the first position, the support unit and the strobe casing are arranged in such a manner as to be mounted on the top surface of the camera body.

In this structure, a reference of a shift of the support unit and the strobe casing is set on the top surface of the camera body, which can increase a distance from the camera body to the strobe casing at the second position.

According to the sixth aspect of the invention, the support unit and the strobe casing are provided in a top-surface part of the camera body, and when the strobe casing is at the first position, the support unit and the strobe casing are arranged in such a manner as to be housed in the top-surface part of the camera body.

A camera with a built-in strobe according to the seventh aspect of the invention includes a first elastic member for driving the support unit to the second position with respect to the camera body, a second elastic member for driving the strobe casing to the second position with respect to the support unit, and a third engaging section for engaging the strobe casing at the first position.

In this structure, the strobe casing can be engaged at the first position by the third engaging section, and can be shifted from the first position to the second position by releasing the engagement of the third engaging section.

According to the eighth aspect of the invention, a cover section is integral with the support unit and covers the strobe light-emitting section when the strobe casing is at the first position.

In this structure, the support unit can be also used as a cover when the strobe is not used. Since the cover section is integral with the support unit, when the support unit is shifted with respect to the camera body, the positional relationship between the strobe casing and the cover section in turning around the second turning section is constant. This can prevent the strobe casing and the cover section from being damaged by coming into contact with each other.

According to the ninth aspect of the invention, a fourth engaging section exclusively engages the support unit at the first position.

In this structure, the engagement of the third engaging section can be released while the support unit is engaged at the first position by the fourth engaging section, which can exclusively shift the strobe casing from the first position to the second position while the support unit is kept at the first position.

According to the tenth aspect of the invention, the third engaging section and the fourth engaging section are provided in a pop-up manipulation member attached to the camera body or in a member linked with the pop-up manipulation member, and the pop-up manipulation member is manipulated when the strobe casing is at the first position so as to distinguish between an operation of shifting the strobe casing and the support unit to the second position and an operation of shifting the strobe casing alone from the first position to the second position.

In this structure, the operation of the strobe casing can be selectively operated only by manipulating one pop-up manipulation member, which leads to an improvement of convenience.

According to the eleventh aspect of the invention, a restrictor restricts the turning of the strobe casing towards the first position with respect to the support unit within a prescribed turning range of the support unit with respect to the camera body when the strobe casing is shifted from the second position to the first position.

In this structure, even when the cover section is provided in front of a storage place of the strobe casing in the camera body in such a manner as to be fixedly provided on the camera body, the strobe casing can be prevented from coming into contact with the cover section and from being damaged while it is shifting from the second position to the first position.

As described above, the present invention provides excellent effects of reducing the whole size of the camera, while having a pop-up mechanism that enables a strobe casing attached to a camera body to be shiftable between a first position and a second position, and of reducing the diffused reflection of emitted light which is caused by the presence of a lens barrel or other components in the center of a front surface of the camera body.

BRIEF DESCRIPTION OF THE DRAWINGS

FIGS. 19(a) and 19(b) are enlarged views of a main part of a conventional camera with a built-in strobe, wherein FIG. 19(a) is a view showing a state where a strobe casing is in a housing position and FIG. 19(b) is a view showing a state where the strobe casing is in a projecting position;

FIGS. 22(a) and 22(b) are enlarged views of the another conventional camera with a built-in strobe, wherein FIG. 22(a) is a view showing a state where a strobe block is in a projecting position and FIG. 22(b) is a view showing a state where the strobe block is in a housing position.

EMBODIMENTS

Embodiment 1

Figure 1:
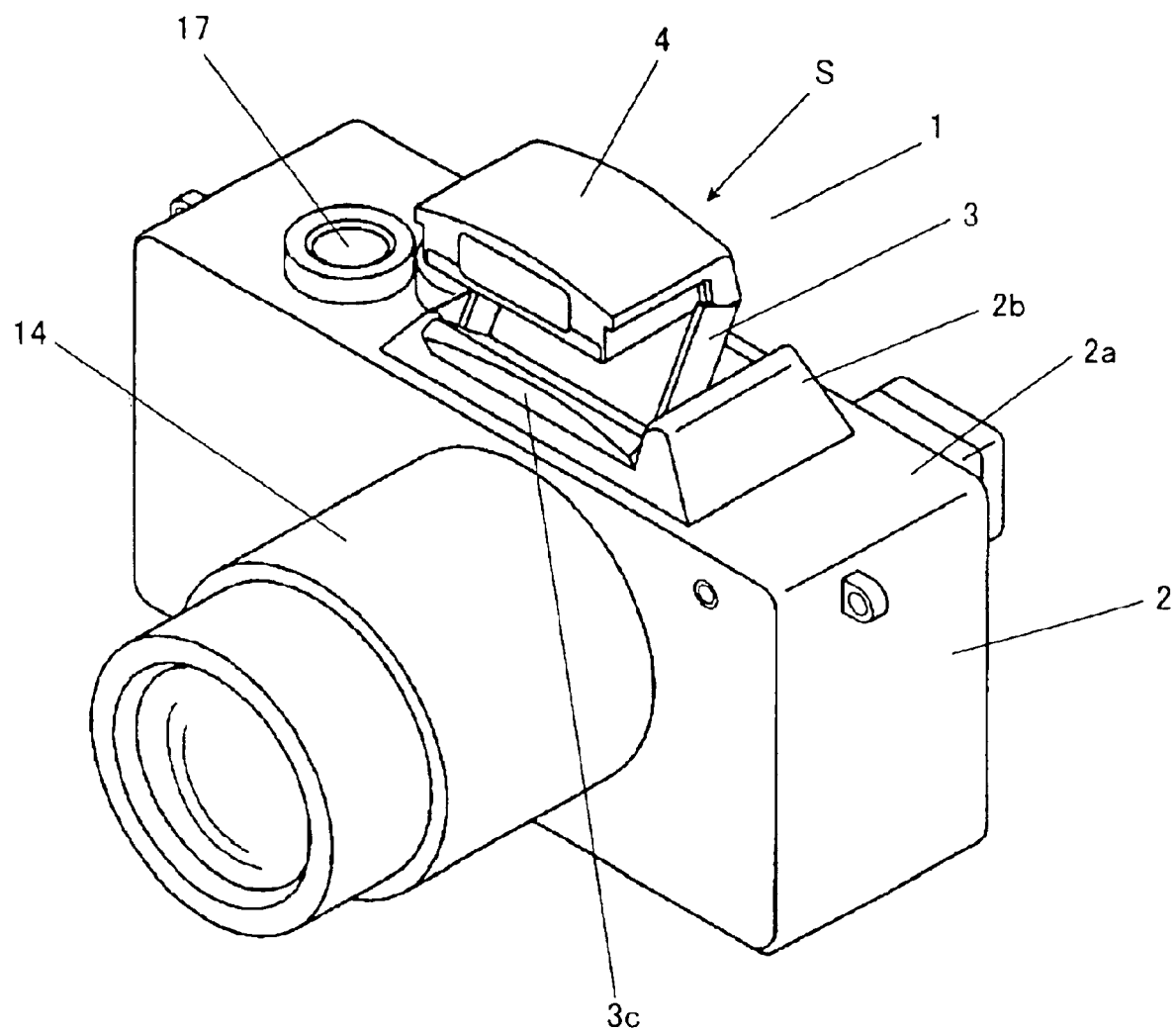
FIG. 1 is a perspective view of a camera with a built-in strobe at a second position according to a first embodiment of the present invention.
Figure 2:
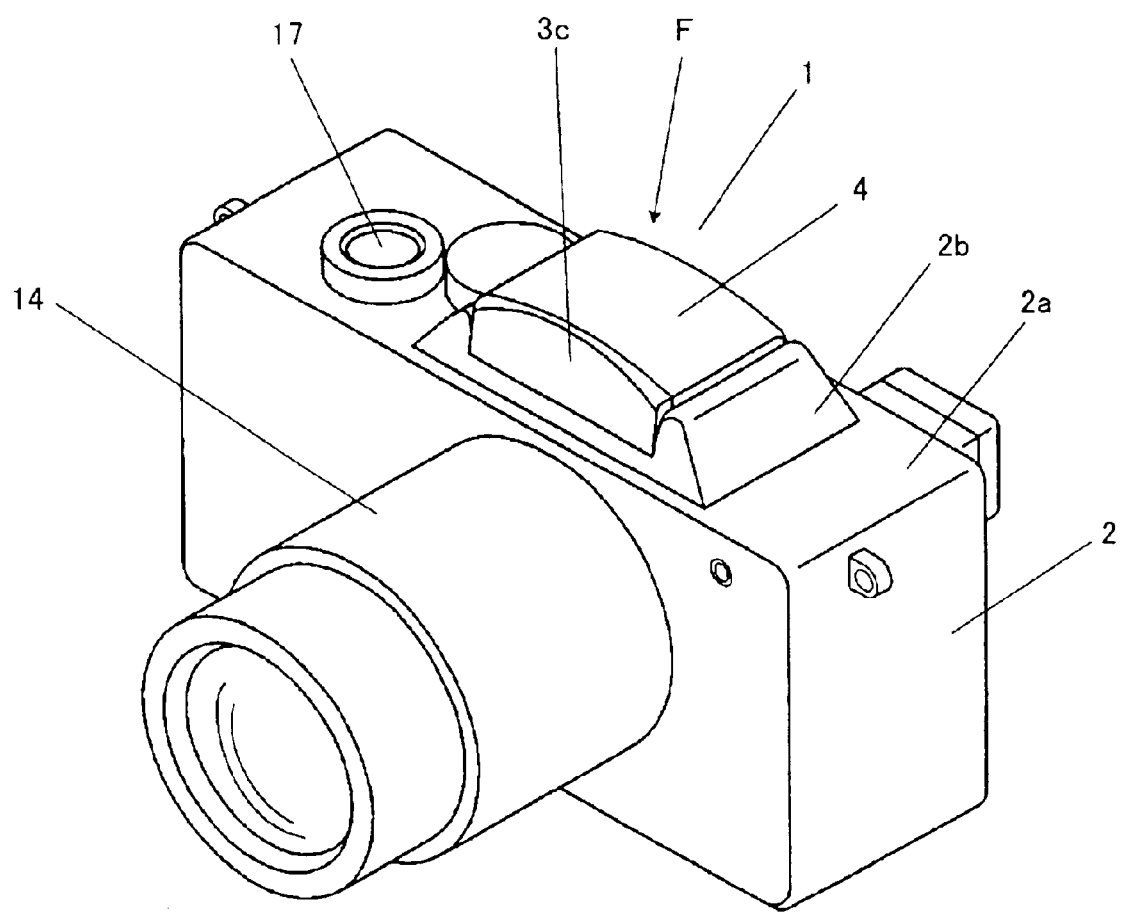
FIG. 2 is a perspective view of the camera with a built-in strobe at a first position according to the first embodiment of the present invention.
Figure 3:
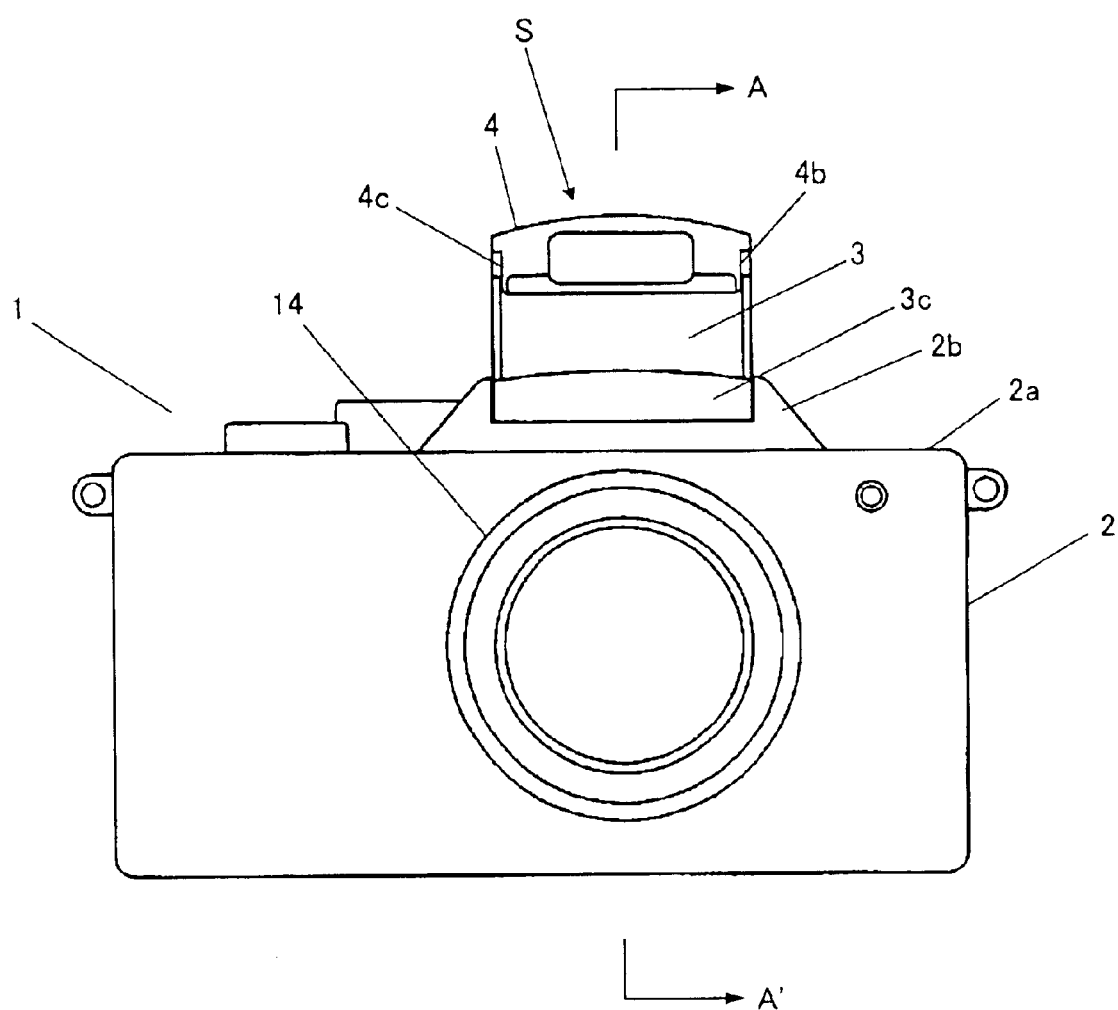
FIG. 3 is a front view of the camera with a built-in strobe at the second position according to the first embodiment of the present invention.
Figure 4:
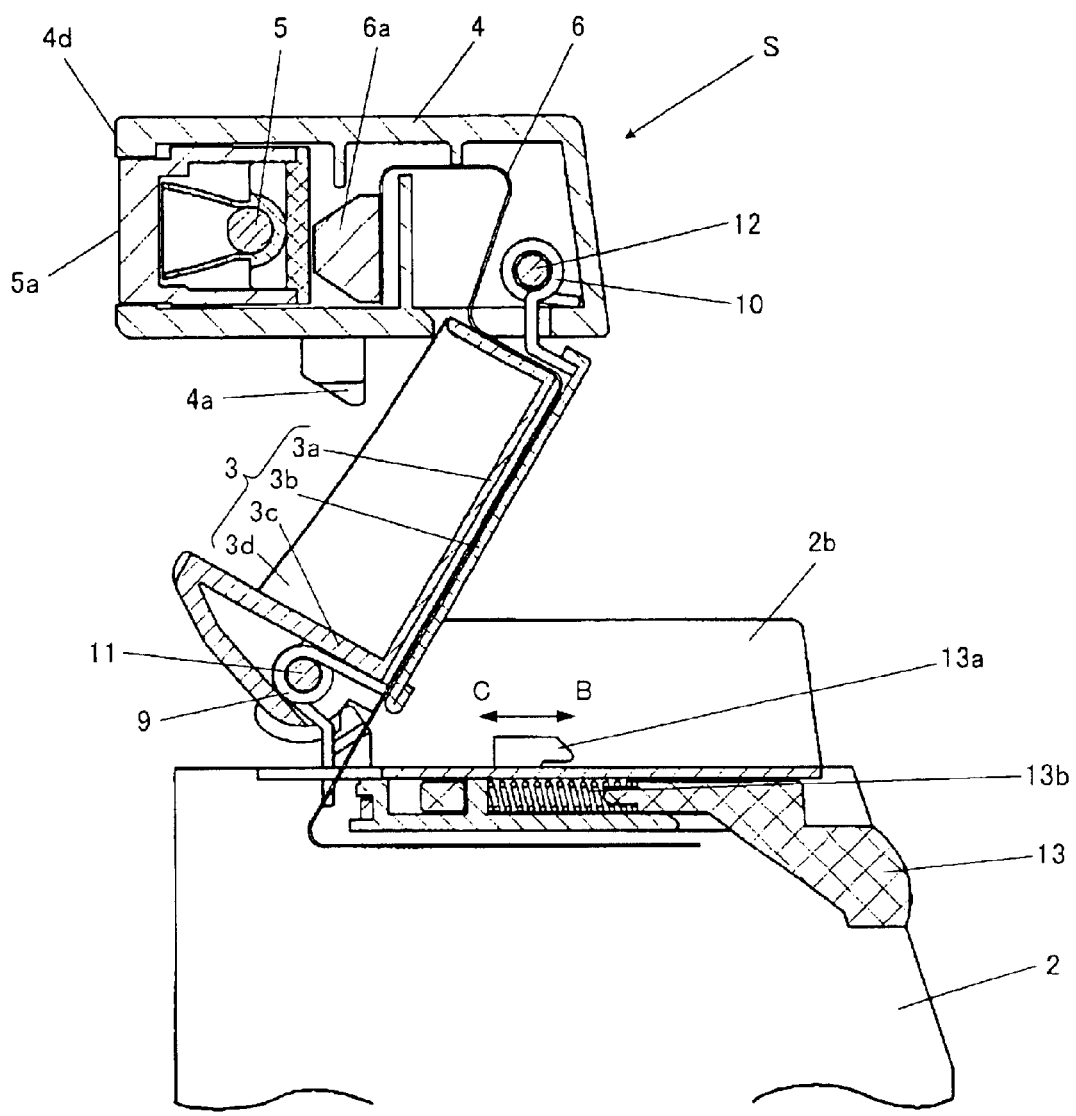
FIG. 4 is an enlarged view of the main part taken along line A–A' of FIG. 3 at the second position.
Figure 5:
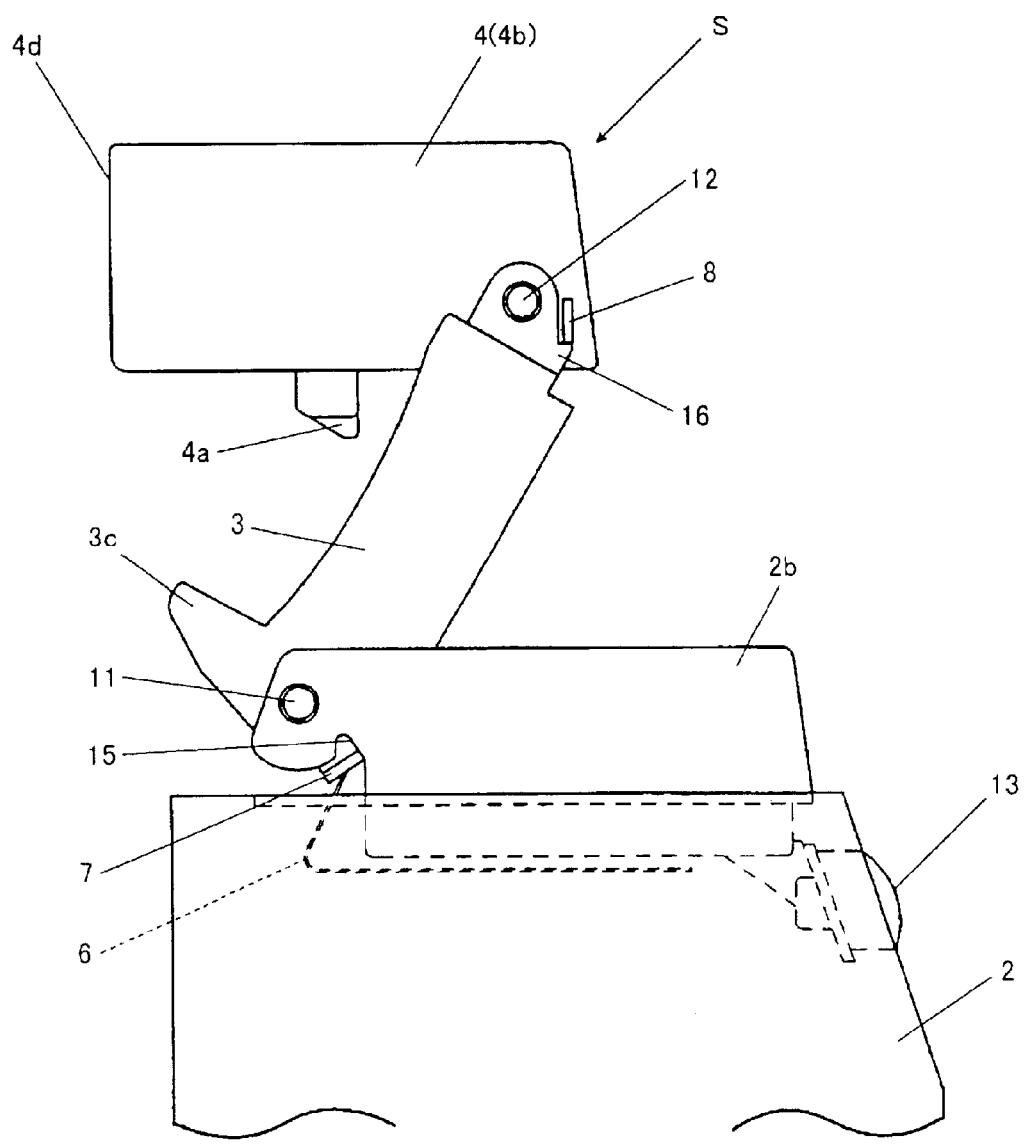
FIG. 5 is an enlarged view of a side surface of the camera with a built-in strobe at the second position according to the first embodiment of the present invention.
Figure 6:
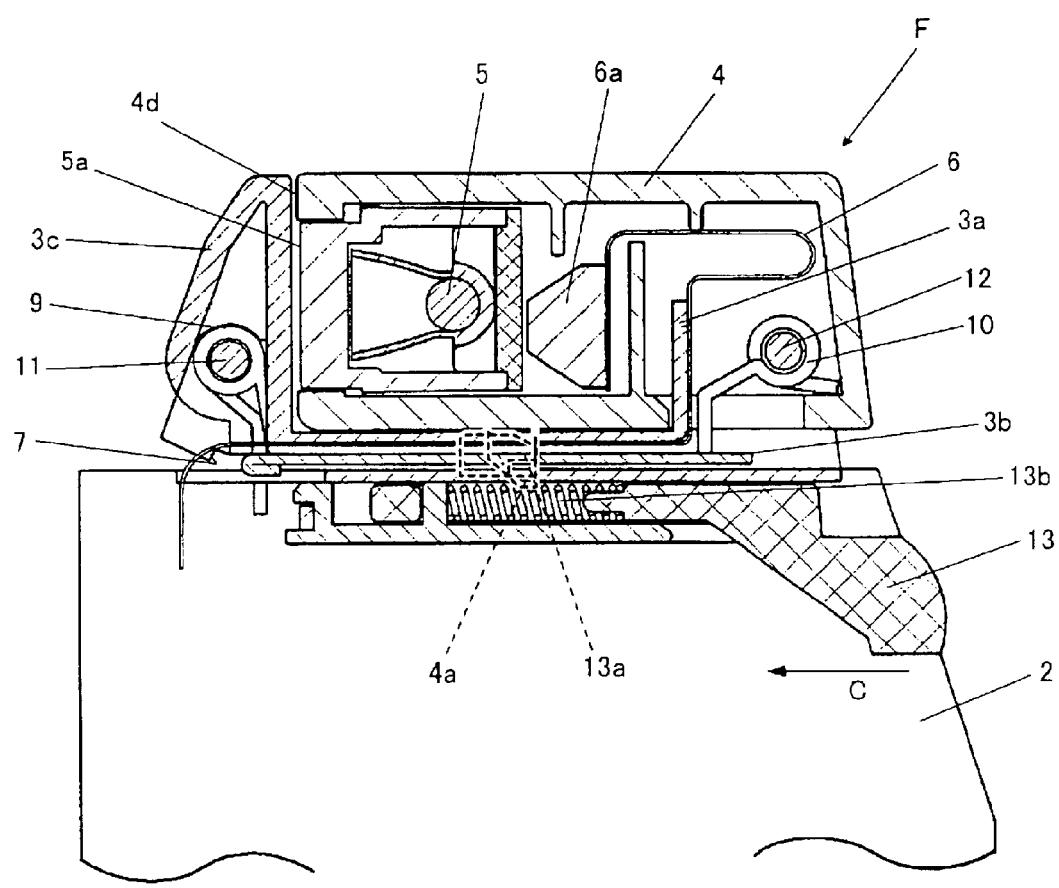
FIG. 6 is an enlarged view of a cross section taken along line A–A' of FIG. 3 at the first position.

FIGS. 1 and 2 are perspective views of a camera with a built-in strobe in a first embodiment of the present invention; FIG. 3 is a front view of the same; FIGS. 4 and 6 are enlarged views of the main part of the camera with a built-in strobe taken along line A–A' of FIG. 3; and FIG. 5 is an enlarged side view of the main part of the camera with a built-in strobe in the first embodiment of the present invention. FIG. 1 and FIGS. 3 to 5 show a state where a strobe casing 4 is at a second position S, and FIGS. 2 and 6 show a state where the strobe casing 4 is at a first position F. The terms "the first position" and "the second position" used in the present specification and claims indicate the relative positional relationship that the strobe casing 4 is farther from a camera body 2 when it is at the second position than when it is at the first position.

As shown in FIGS. 1 to 3, in the camera 1 with a built-in strobe, on a top surface 2a of the camera body 2 are provided the strobe casing 4 which is approximately rectangular parallelepiped and a support unit 3 which supports the strobe casing 4. The strobe casing 4 is farther from-the camera body 2 and a lens barrel 14 when it is at the second position S shown in FIG. 1 than when it is at the first position F shown in FIG. 2. On the top surface 2a of the camera body 2 are provided manipulation parts including a shutter release button 17. In addition, there is the lens barrel 14 containing a zoom lens inside at the position which is on the front surface of the camera body 2 and is ahead of the strobe casing 4.

As shown in FIG. 4, the support unit 3 has a first turning section 11 and a second turning section 12, and is turnably supported on the camera body through the first turning section 11. The first turning section 11 and the second turning section 12 are each formed of a cylindrical axis material. The support unit 3 is approximately C-shaped channel mainly equipped with a side surface part 3d and a flat surface part, and also with a front surface part having a cover section 3c. A flat surface part of the support unit 3 is formed of a first plate 3a and a second plate 3b stuck to each other. The cover section 3c contains a first elastic member 9 made from an elastic member such as a coil spring which is provided around the first turning section 11, and the first elastic member 9 drives the support unit 3 to the second position S with respect to the camera body 2.

The strobe casing 4 is turnably supported on the support unit 3 at the side surface 4b through the second turning section 12 (see FIG. 5). As shown in FIG. 4, a second elastic member 10 made from an elastic member such as a coil spring is provided at the rear end bottom of the strobe casing 4 in such a manner as to be provided around the second turning section 12. The second elastic member 10 drives the strobe casing 4 to the second position S with respect to the support unit 3.

When the strobe casing 4 is at the first position F as shown in FIG. 6, the first turning section 11 is located to position itself toward the front of the support unit 3 and ahead of the strobe casing 4, and the second turning section 12 is located to position itself toward the rear of the support unit 3. The second turning section 12 is located to position itself toward the rear of the support unit 3 when the strobe casing 4 is at the first position F and is located to position itself toward the rear of the strobe casing 4 whether the strobe casing 4 is at the first position F or the second position S. To be more specific, in the camera 1 with a built-in strobe of the first embodiment, when the strobe casing 4 is at the first position F, the first turning section 11 is located to position itself toward the front of the support unit 3, and the second turning section 12 is located to position itself toward the rear of the support unit 3. When the strobe casing 4 is shifted from the first position F to the second position S, the support unit 3 is turned diagonally upwards around the first turning section 11 so that the strobe casing 4 shifted to the second position S can face straight ahead approximately the same as when it is at the first position F.

The strobe casing 4 has a strobe light-emitting section 5 and also contains a wiring section 6 and a trigger coil 6a therein. The strobe light-emitting section 5 is disposed on the surface (front-surface part) parallel to the axes of the first turning section 11 and the second turning section 12. The wiring section 6 is a flexible wiring board made of polyimide or the like, and functions to electrically connect the strobe light-emitting section 5 and the camera body 2. The electrical connection between the strobe light-emitting section 5 and the wiring section 6 is achieved by copper wiring (not illustrated). The wiring section 6 is sandwiched between the first plate 3a and the second plate 3b somewhere between the strobe casing 4 and the camera body 2.

The trigger coil 6a is a boosting transformer, and functions to boost a voltage of e.g., 300 volts to 3000 volts. The strobe light-emitting section 5 starts emission with the electric power boosted by the trigger coil 6a. The strobe light-emitting section 5 can emit light when the strobe casing 4 is at the second section S.

The strobe casing 4 has a latch section 4a which is latched to a third engaging section (pop-up manipulation member) formed on the camera body 2. The third engaging section 13 can slide in the directions B and C shown in FIG. 4, has a hook part 13a, and is driven in the direction B by a spring member 13b. When the strobe casing 4 is at the first position F, the hook part 13a of the third engaging section 13 is latched to the latch section 4a, which makes the third engaging section 13 engage the strobe casing 4 to keep it at the first position F.

As shown in FIG. 5, a top-surface protruding part 2b which protrudes from the top surface 2a of the camera body 2 has a first engaging section 15; the support unit 3 has a first projecting part 7 and a second engaging section 16; and the strobe casing 4 has a second projecting part 8. In this structure, the first engaging section 15 comes into contact with the first projecting part 7 of the support unit 3, thereby engaging the turning of the support unit 3 with respect to the camera body 2 at the second position S. Consequently, the support unit 3 is engaged at the second position S in spite that it is constantly driven by the first elastic member 9 in the counterclockwise direction of the figure. The second engaging section 16 of the support unit 3 comes into contact with the second projecting part 8 of the strobe casing 4, thereby engaging the turning of the strobe casing 4 with respect to the support unit 3 at the second section S. Consequently, the strobe casing 4 is engaged at the second position S in spite that it is constantly driven by the second elastic member 10 in the clockwise direction of the figure.

As shown in FIG. 6, when the strobe casing 4 is at the first position F, the latch section 4a of the strobe casing 4 and the hook part 13a of the third engaging section 13 are latched to each other, which makes the third engaging section 13 engage the strobe casing 4 to keep it at the first position F. When the strobe casing 4 is thus set at the first position F, the side surface part 3d and the flat surface part of the support unit 3 cover the side surfaces 4b and 4c of the strobe casing 4. Although it is not illustrated, the support unit 3 includes a through hole to make the latch section 4a of the strobe casing 4 and the hook part 13a of the third engaging section 13 pass therethrough. When the strobe casing 4 is at the first position F, the irradiation window 5a of the strobe light-emitting section 5 is covered by a cover section 3c to prevent light emission.

The support unit 3 and the first projecting part 7 of the first embodiment are an example of the support unit of the present invention; the strobe casing 4, the latch section 4a and the second projecting part 8 of the first embodiment are an example of the strobe casing of the present invention; the strobe light-emitting section 5 and the irradiation window 5a of the first embodiment is an example of the strobe light-emitting section of the present invention; the third engaging section 13, the hook part 13a and the spring member 13b of the first embodiment are an example of the third engaging section of the present invention.

The behavior of the camera 1 with a built-in strobe thus structured will be described with reference to FIGS. 4 to 6.

First, description will be given of the operation of the strobe casing 4 of the camera 1 with a built-in strobe when it is shifted from the first position F shown in FIG. 6 to the second position S shown in FIGS. 4 and 5.

As shown in FIG. 6, when the strobe casing 4 of the camera 1 with a built-in strobe is at the first position F, the hook part 13a of the third engaging section 13 is latched to the latch section 4a of the strobe casing 4 so as to keep the strobe casing 4 at the first position F. In other words, the strobe casing 4 is kept in such a manner that it is directly mounted on the top surface 2a of the camera body 2.

In this state, if the user shifts the third engaging section 13 forwards and slides the hook part 13a in the direction C, then the latch between the hook part 13a and the latch section 4a is released.

Then, the support unit 3 turns around the first turning section 11 in the counterclockwise direction of the figure with respect to the camera body 2 by the driving force of the first elastic member 9. The strobe casing 4 turns around the second turning section 12 in the clockwise direction of the figure with respect to the support unit 3 by the driving force of the second elastic member 10. After this, the support unit 3 keeps turning with respect to the camera body 2, and stops turning when the first projecting part 7 comes into contact with the first engaging section 15. Similarly, the strobe casing 4 keeps turning with respect to the support unit 3, and stops turning when the second projecting part 8 comes into contact with the second engaging section 16. Thus, the strobe casing 4 is shifted from the first position F not only upwards but also forwards to reach the second position S. Further, in the camera 1 with a built-in strobe, whether it is at the first position F or the second position S, the strobe casing 4 is kept in such a manner that the strobe light-emitting section 5 faces straight ahead.

As described above, as soon as the user shifts the third engaging section 13 in the direction C, the strobe casing 4 is shifted from the first position F to the second position S so as to make the strobe light-emitting section 5 ready to emit light.

Then, description will be given of the operation of the strobe casing 4 of the camera 1 with a built-in strobe to shift from the second position S shown in FIGS. 4 and 5 to the first position F shown in FIG. 6.

In FIGS. 4 and 5, the support unit 3 is driven by the first elastic member 9; the first engaging section 15 engages the support unit 3 by coming into contact with the first projecting part 7; and the second engaging section 16 engages the strobe casing 4 by coming into contact with the projecting part 8.

In this state, when the user pushes the top surface of the strobe casing 4 towards the camera body 2, the engagement between the first projecting part 7 and the first engaging section 15 and the engagement between the second projecting part 8 and the second engaging section 16 are released. Consequently, the strobe casing 4 shifts towards the camera body 2; the support unit 3 turns in the clockwise direction of the figure around the first turning section 11 with respect to the camera body 2 against the driving force of the first elastic member 9; and the strobe casing 4 turns in the counterclockwise direction of the figure around the second turning section 12 with respect to the support unit 3 against the driving force of the second elastic member 10.

When the user continues to push the top surface of the strobe casing 4 towards the camera body 2, the latch section 4a starts to come into contact with the third engaging section 13. When the top surface of the strobe casing 4 is further pushed, the hook part 13a is pushed away by the latch section 4a and is shifted in the direction C.

When the hook part 13a is shifted until it cannot be pushed any more, the third engaging section 13 is shifted in the direction B by the driving force of the spring member 13b so that the hook part 13a and the latch section 4a are latched to each other. Hence, the third engaging section 13 engages the strobe casing 4 at the first position F to set the strobe casing 4 in the state shown in FIG. 6. In this state, the irradiation window 5a for the strobe light-emitting section 5 is covered by the cover section 3c to prevent light emission.

Since the second turning section 12 of the support unit 3 turnably supports the side surfaces 4b, 4c of the strobe casing 4, when the strobe casing 4 is at the first position F, the side part of the support unit 3 can be arranged close to the side surfaces 4b, 4c of the strobe casing 4. Furthermore, arranging the support unit 3 in the fore-and-aft direction enables the plates 3a, 3b which are the flat-surface part of the support unit 3 to be arranged right under the strobe casing 4. This structure is utilized to arrange the support unit 3 in such a manner as to cover the side surfaces 4b, 4c and bottom surface of the strobe casing 4 when the strobe casing 4 is at the first position F. Consequently, in the case where the strobe casing 4 is approximately rectangular parallelepiped, when the strobe casing 4 is at the first position F, the support unit 3 and the strobe casing 4 can be housed in an extremely small space efficiently in such a manner as to be arranged close to each other.

When the strobe casing 4 is at the first position F, the first turning section 11 is located to position itself toward the front of the support unit 3 and the second turning section 12 is located to position itself toward the rear of the support unit 3, and the second turning section 12 is located to position itself toward the rear of the strobe casing 4 not only when the strobe casing 4 is at the first position F but also when it is at the second position S. Therefore, when the strobe casing 4 is projected to the second position S, the strobe casing 4 shifts not only upwards but also forwards. As a result, it becomes possible to reduce the diffused reflection of the light emitted from the strobe casing 4 which is caused by the presence of the lens barrel 14 and other components in the center of the front surface of the camera body 2, as compared with the structure where the strobe casing is shifted upwards only when projected to the second position.

The provision of the first turning section 11 of the support unit 3 ahead of the strobe casing 4 when the strobe casing 4 is at the first position F can eliminate the need for the provision of the first turning section 11 which is the axis support of the support unit 3 under the strobe casing 4. This contributes to a reduction in the space in the vertical direction into which the camera 1 with a built-in strobe is accommodated when the strobe casing 4 is at the first position F.

As described above, the camera 1 with a built-in strobe of the first embodiment includes the support unit 3 which has the first turning section 11 and the second turning section 12 and which is turnably supported on the camera body 2 through the first turning section 11; the strobe casing 4 which are turnably supported at sides 4b, 4c thereof on the support unit 3 through the second turning section 12, the strobe casing 4 containing the strobe light-emitting section 5 and being shiftable between the first position F and the second position S; the first engaging section 15 for engaging the support unit 3 at the second position S; and the second engaging section 16 for engaging the strobe casing 4 at the second position S. This can reduce the space necessary for the provision of the portion used to turnably support the strobe casing 4, thereby being able to miniaturize the camera 1 with a built-in strobe itself. Furthermore, the first turning section 11 is located to position itself toward the front of the support unit 3 when the strobe casing 4 is at the first position F, and the second turning section 12 is located to position itself toward the rear of the support unit 3 when the strobe casing 4 is at the first position F and which is located to position itself toward the rear of the strobe casing 4 not only when the strobe casing 4 is at the first position F but also when it is at the second position S. Therefore, when the strobe casing 4 is projected to the second position S, the strobe casing 4 shifts not only upwards but also forwards. As a result, it becomes possible to reduce the diffused reflection of the emitted light which is caused by the presence of the lens barrel 14 and other components in the center of the front surface of the camera body 2.

According to the first embodiment, the support unit 3 and the strobe casing 4 are so arranged as to be mounted on the top surface 2a of the camera body 2, and the top surface 2a of the camera body 2 becomes the reference of the shift of the support unit 3 and the strobe casing 4. Therefore, the strobe casing 4 can be engaged at the second position S which is farther from the camera body 2 than in the conventional example where the support unit and other components are provided inside. This structure can also reduce the diffused reflection of the light from the strobe light-emitting section 5 which is caused by the presence of the lens barrel 14 and other components in the center of the front surface of the camera body 2.

In addition, according to the first embodiment, the wiring section 6 is provided to electrically connect the strobe light-emitting section 5 and the camera body 2; the support unit 3 includes the two plates 3a, 3b; and the wiring section 6 is sandwiched between the two plates 3a, 3b so as not to be exposed outside when the strobe casing 4 is at the second position S away from the camera body 2, thereby preventing the wiring section 6 from being damaged by coming into contact with other components. Since the wiring section 6 is constantly sandwiched between the two plates 3a, 3b, and is kept in a stable state while curving at the points in the vicinity of the first and second turning sections 11 and 12, the wiring inside the wiring section 6 is protected from being disconnected, thereby improving reliability.

Furthermore, according to the first embodiment, when the strobe casing 4 is at the first position F, the first turning section 11 of the support unit 3 is disposed ahead of the strobe casing 4, which means the first turning section 11 is never disposed to project below the strobe casing 4. This can reduce the distance between the top surface 2a of the camera body 2 and the top surface of the strobe casing 4 when the strobe casing 4 is at the first position F, thereby realizing a compact camera 1 with a built-in strobe.

In addition, according to the first embodiment, the camera 1 with a built-in strobe is composed of the first elastic member 9 which drives the support unit 3 to the second position S with respect to the camera body 2; the second elastic member 10 which drives the strobe casing 4 to the second position S with respect to the support unit 3; and the third engaging section 13 for engaging the strobe casing 4 at the first position F. This enables the strobe casing 4 to be engaged at the first position F by the third engaging section 13, and also enables the strobe casing 4 to be automatically shifted from the first position F to the second position S by releasing the engagement of the third engaging section. Hence, the user can easily shift the strobe casing 4 from the first position F to the second position S by manipulating the third engaging section 13, so as to allow the strobe light-emitting section 5 to emit light, thereby facilitating taking photographs.

Furthermore, according to the first embodiment, the cover section 3c which covers the strobe light-emitting section 5 when the strobe casing 4 is at the first position F is integrated with the support unit 3. This enables the support unit 3 to be used as the cover section 3c when the strobe is not used. Since the cover section 3c is integral with the support unit 3, when the support unit 3 is shifted with respect to the camera body 2, the positional relationship between the strobe casing 4 and the cover section 3c to turn the second turning section 12 is constant. By designing the distance from the second turning section 12 to the cover section 3c to be a little larger than the strobe casing 4, when the strobe casing 4 is closed towards the support unit 3, the strobe casing 4 can be prevented from being contact with the cover section 3c regardless of the position of the support unit 3, thereby preventing the damage caused by contact.

The first embodiment includes the cover section 3c; however, it is also possible to design the strobe light-emitting section 5 to be emittable at the first position F, without providing the cover section 3c. This structure is convenient because the user can use strobe light by optionally selecting either the first position F or the second position S.

In the first embodiment, the support unit 3 is turnably supported directly on the camera body 2; however, it is also possible to provide a second support unit so that the support unit 3 can be turnably supported on the second support unit, which is turnably supported on the camera body 2. In this structure, not only the strobe casing 4 can turn with respect to the support unit 3 and the support unit 3 can turn with respect to the second support unit, but also the second support unit can turn with respect to the camera body 2, which increases the number of turnable sites from two to three. This enables the strobe casing 4 to be further separated from the camera body 2 at the second position S without increasing the space necessary for the accommodation of the strobe casing 4 when the strobe casing 4 is at the first position F.

Embodiment 2

Figure 7:
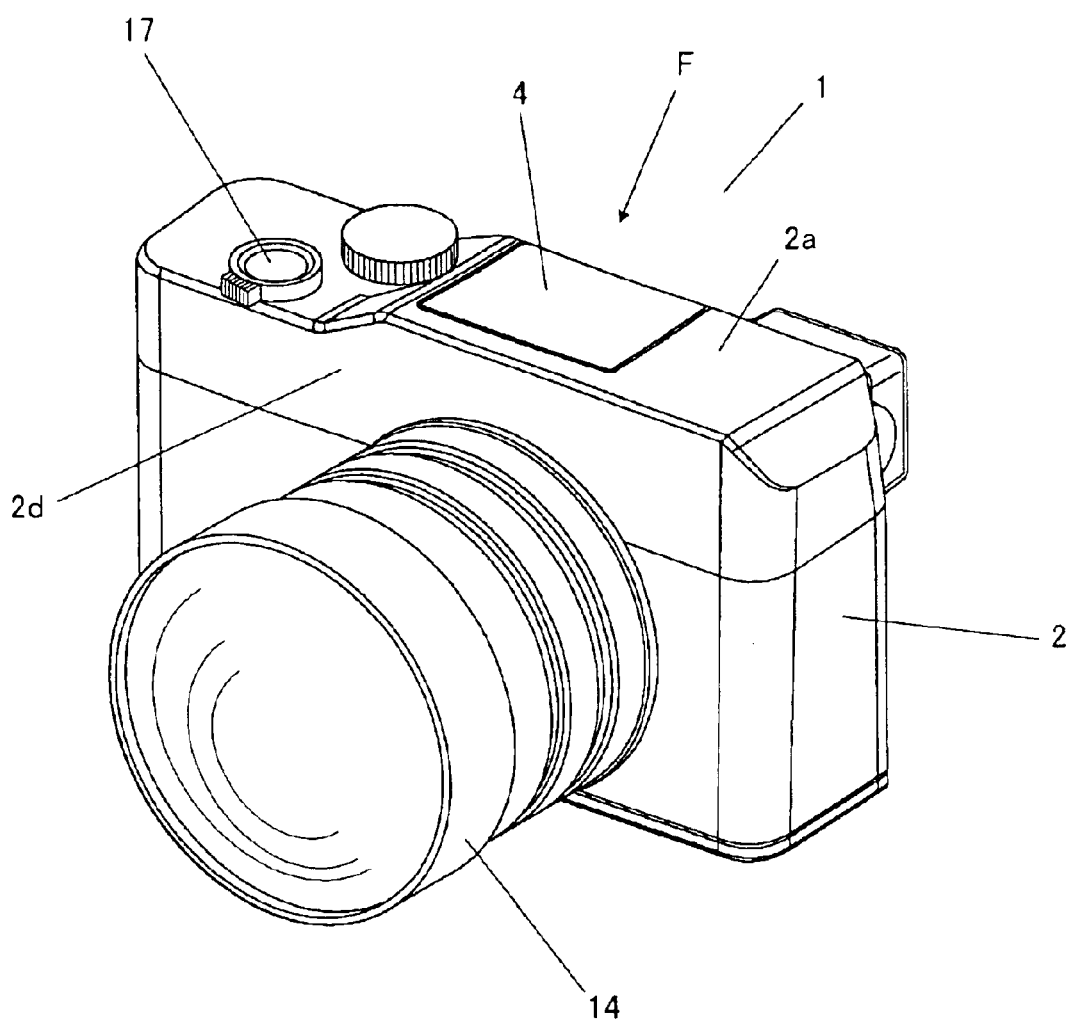
FIG. 7 is a perspective view of a camera with a built-in strobe at a first position according to a second embodiment of the present invention.
Figure 8:
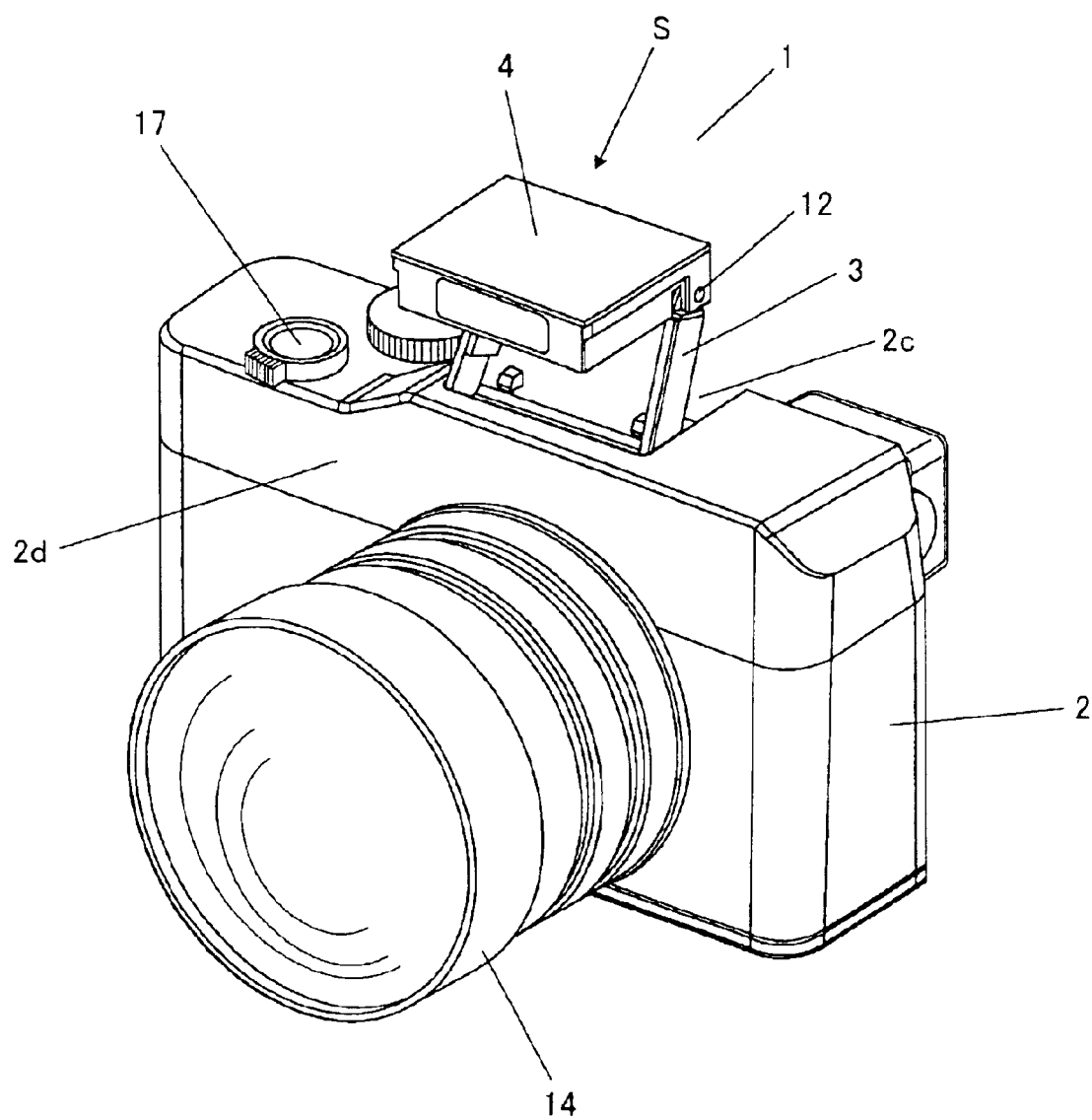
FIG. 8 is a perspective view of the camera with a built-in strobe at a second position according to the second embodiment of the present invention.
Figure 9:
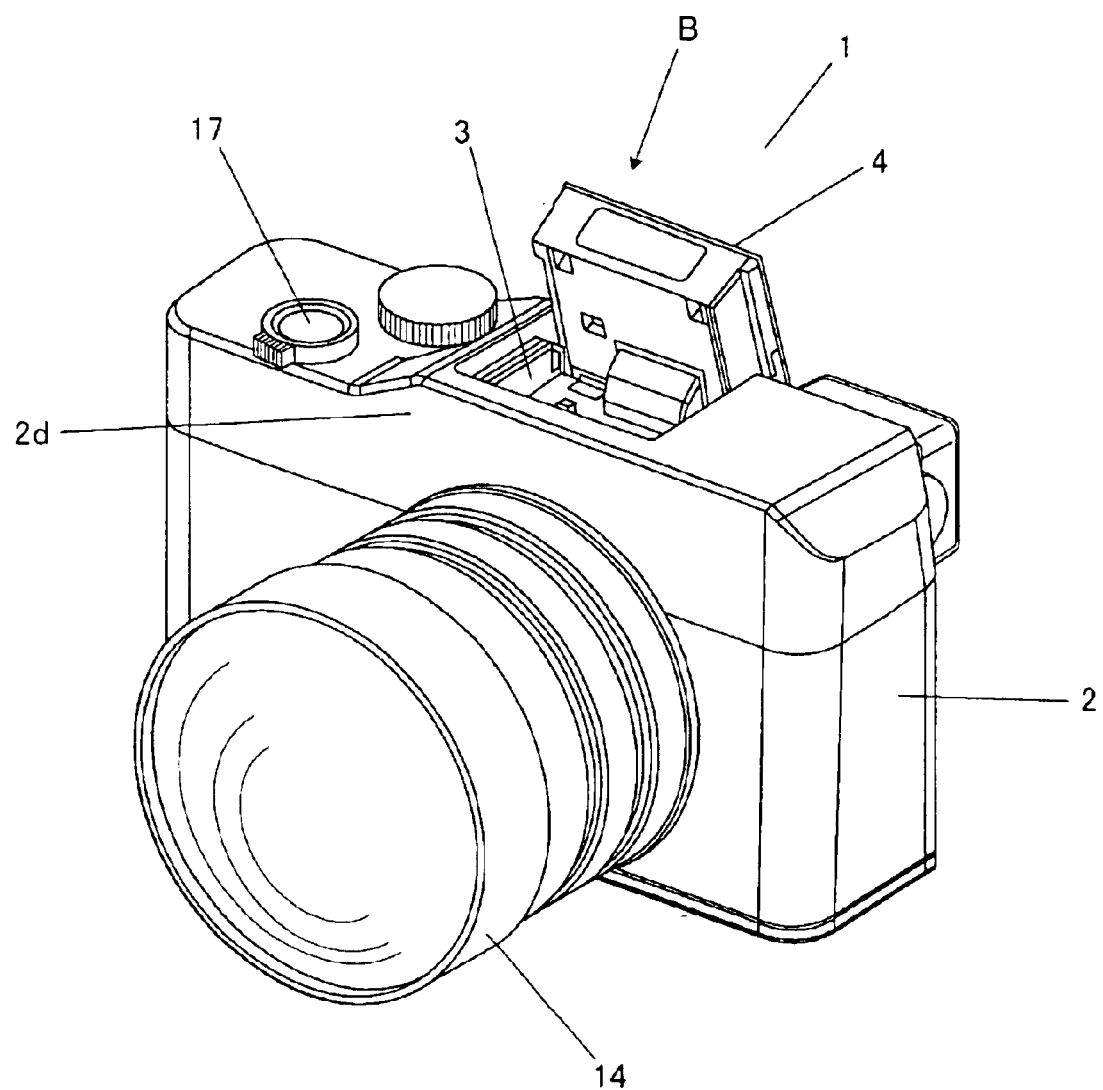
FIG. 9 is a perspective view of the camera with a built-in strobe at a third position according to the second embodiment of the present invention.
Figure 10:
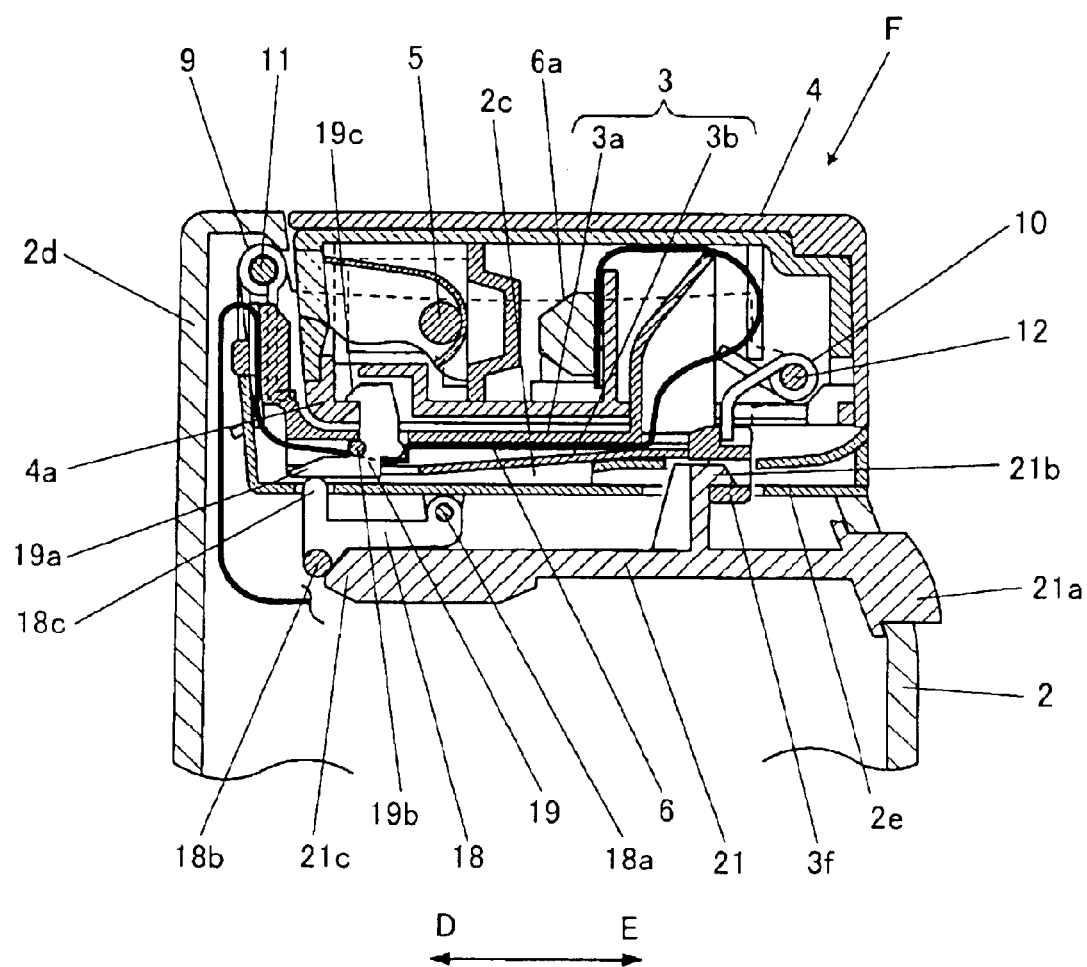
FIG. 10 is an enlarged view of a main part of the camera with a built-in strobe at the first position according to the second embodiment of the present invention.
Figure 11:
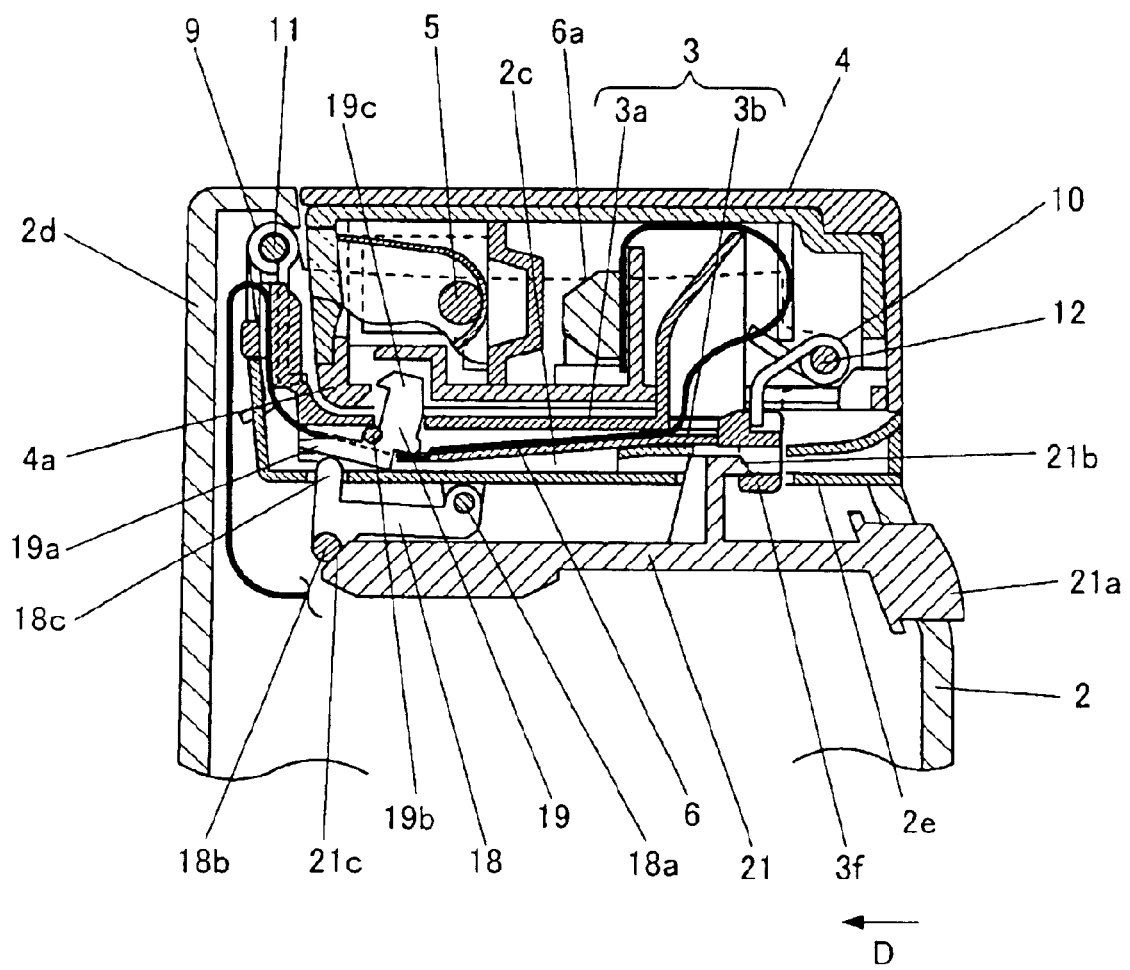
FIG. 11 is an enlarged view of the camera with a built-in strobe at a moment when a third engaging section is pushed at the first position according to the second embodiment of the present invention.
Figure 12:
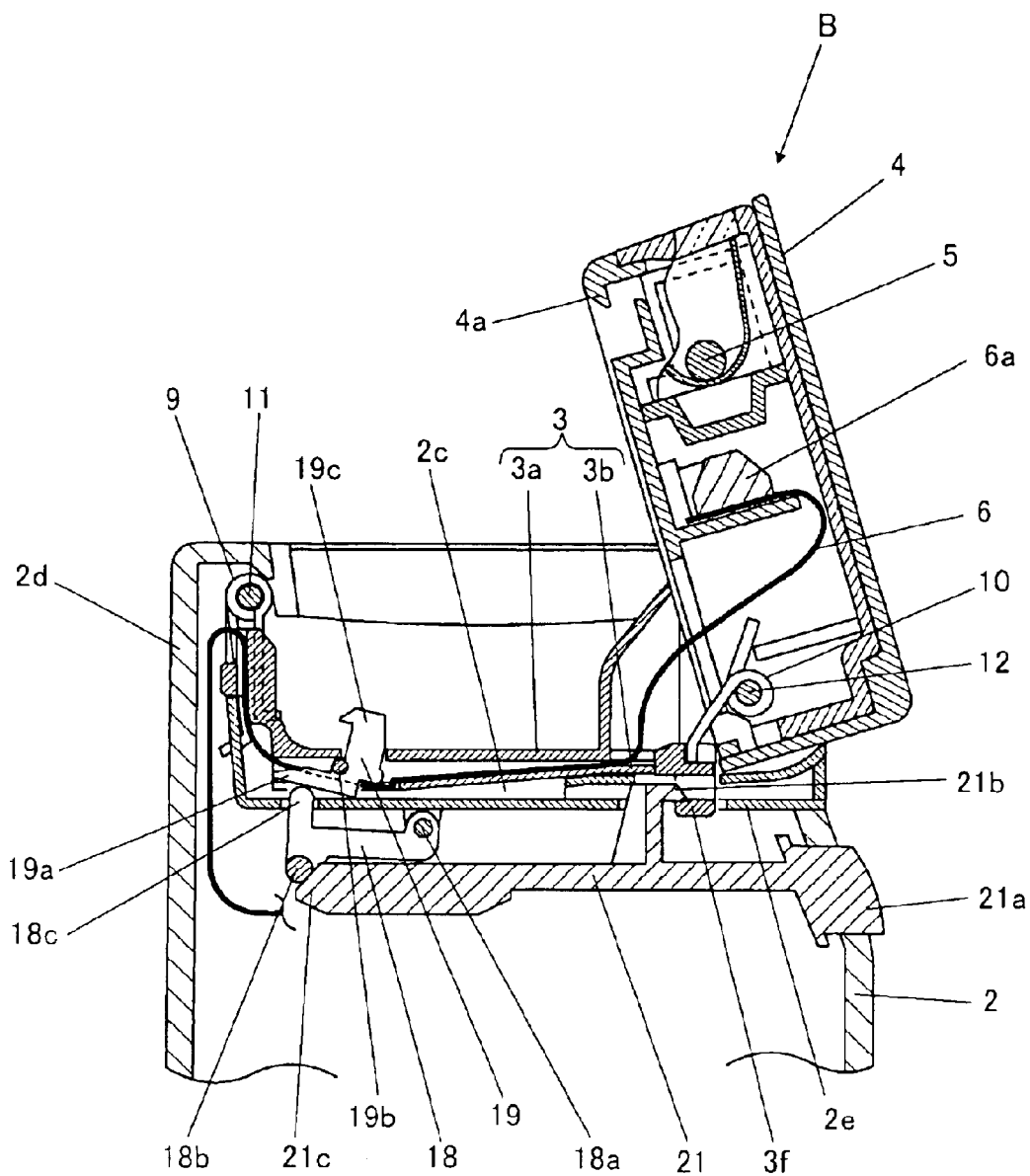
FIG. 12 is an enlarged view of a main part of the camera with a built-in strobe at the third position according to the second embodiment of the present invention.
Figure 13:
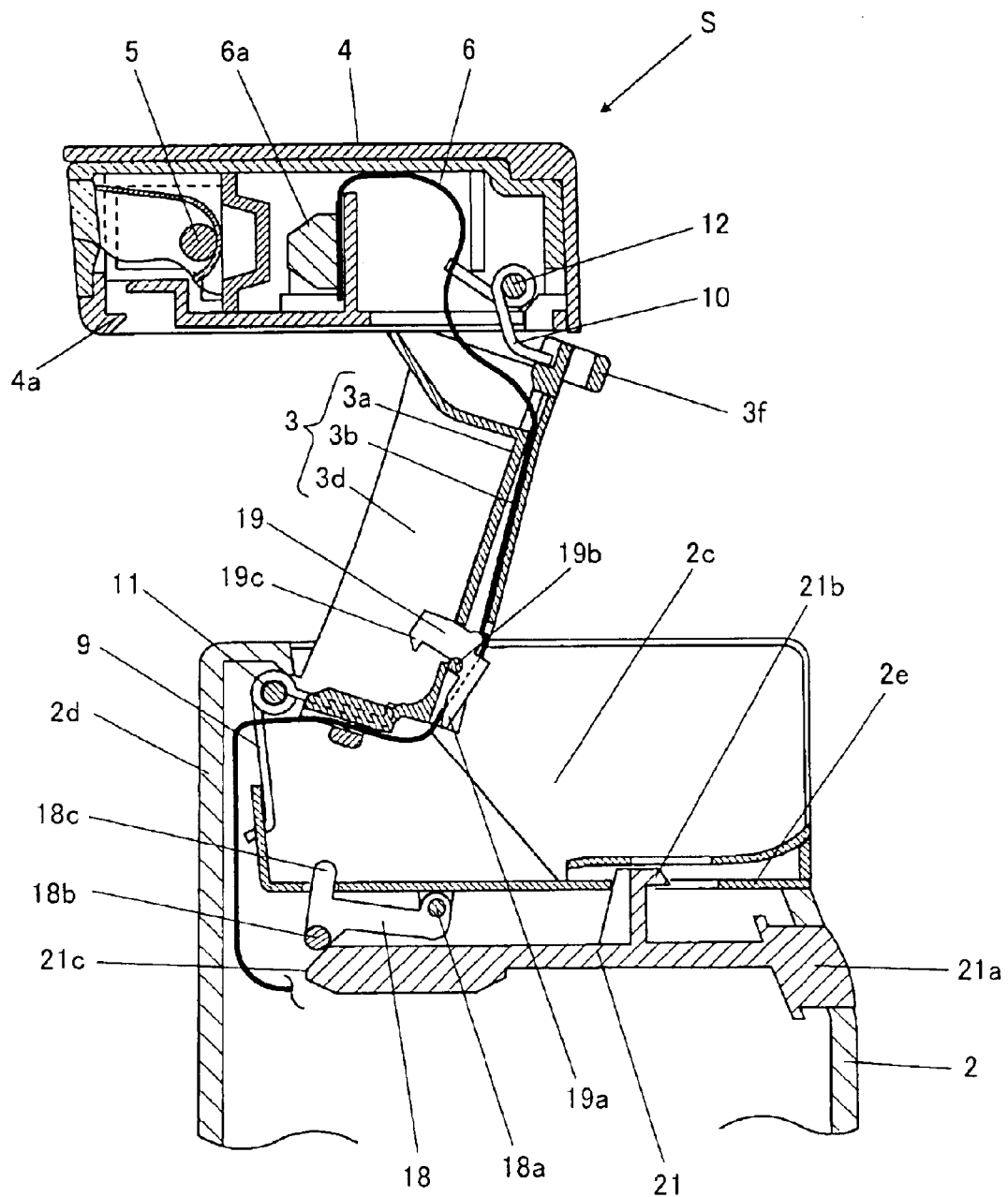
FIG. 13 is an enlarged view of the main part of the camera with a built-in strobe at the second position according to the second embodiment of the present invention.

FIGS. 7 to 9 are perspective views of a camera with a built-in strobe of a second embodiment of the present invention, and FIGS. 10 to 13 are enlarged cross sectional views of the main part of the camera with a built-in strobe. FIGS. 7, 10 and 11 show a state where the strobe casing 4 is at the first position F, FIGS. 8 and 13 show a state where the strobe casing 4 is at the second position S, and FIGS. 9 and 12 show a state where the strobe casing 4 is at a third position B. The components having the same functions as those in the first embodiment are referred to with the same symbols.

As shown in FIGS. 7 to 9, the camera 1 with a built-in strobe also comprises the strobe casing 4 that is approximately rectangular parallelepiped and the support unit 3 that supports the strobe casing 4, which are provided in the top-surface part of the camera body 2. However, in this camera with a built-in strobe, as shown in FIG. 7, when the strobe casing 4 is at the first position F, the support unit 3 and the strobe casing 4 are housed in the top-surface part of the camera body 2. In other words, in the top-surface part of the camera body 2 is provided a housing concave part 2c (see FIG. 13) to house the strobe casing 4, and as shown in FIGS. 10 and 7, when the strobe casing 4 is at the first position F, the strobe casing 4 and the support unit 3 are housed in the housing concave part 2c. In the second embodiment, the housing concave part 2c is formed to be opened from the top surface of the camera body 2 to the rear-surface that is contiguous with the top surface. When the strobe casing 4 is housed at the first position F, the front surface of the strobe casing 4 is covered with the front surface part 2d of the camera body 2, which also functions as a cover section. Although it is not illustrated, at a spot which is ahead of the housing concave part 2c and which is on the front surface part 2d of the camera body 2 includes the logotypes of the zoom lens and other components. Instead of the logotypes of the zoom lens and the like, the brand name and other logotypes can be applied.

As shown in FIGS. 10 to 13, the support unit 3 of the second embodiment is shaped to fit the front surface part, bottom surface and side surfaces of the housing concave part 2c when it is at the first position F, and the first turning section 11 is disposed right under the top end of the front surface of the camera body 2. Similar to the first embodiment, the first turning section 11 is coated with the first elastic member 9 which drives the support unit 3 to the second position S with respect to the camera body 2, and the second turning section 12 disposed at the bottom end in the rear portion of the strobe casing 4 is coated with the second elastic member 10 which drives the strobe casing 4 to the second position S with respect to the support unit 3. The strobe casing 4 is turnably supported on the support unit 3 at its side surfaces through the second turning section 12. The first turning section 11 is located to position itself toward the front of the support unit 3 when the strobe casing 4 is at the first position F, and the second turning section 12 is located to position itself toward the rear of the support unit 3 and which is located to position itself toward rear of the strobe casing 4 not only when the strobe casing 4 is at the first position F but also when it is at the second position S. Although it is not illustrated, similar to the first embodiment, the present embodiment includes the first engaging section 15 and the first projecting part 7 which engage the support unit 3 at the second position S and the second engaging section 16 and the second projecting part 8 which engage the strobe casing 4 at the second position S. The symbol 2e represents a concave-part wall which forms the housing concave part 2c of the camera body 2.

As shown in FIG. 10 and other figures, in the top of the camera body 2 is provided the pop-up manipulation member 21 having the same function as the third engaging section 13 of the first embodiment in such a manner as to be able to be slid in the directions D and E (fore-and-aft direction). The pop-up manipulation member 21 includes a manipulating bottom part 21a which is exposed outside from the camera body 2; the fourth engaging section 21b which is shaped like a hook to be latched to the second latch section 3f formed on the support unit 3; and a third engaging cam section 21c which engages the strobe casing 4 at the first position F. As shown in FIG. 10, the support unit 3 is engaged at the first position F or kept in the housing position along the housing concave part 2c by latching the fourth engaging section 21b of the pop-up manipulation member 21 with the second latch section 3f formed on the support unit 3.

The third engaging cam section 21c formed on the pop-up manipulation member 21 is designed to be able to be in contact with a first interlocking lever 18 which is turnably supported in the camera body 2, and the first interlocking lever 18 is designed to be able to be in contact a the second interlocking lever 19 which is turnably supported in the support unit 3, and the second interlocking lever 19 is designed to be able to be latched to the latch section 4a formed on the strobe casing 4. In other words, the first interlocking lever 18 is supported in such a manner as to be turnable around the axis part 18a in the camera body 2, and the third engaging cam section 21c formed on the pop-up manipulation member 21 can be raised so as to come into contact with a first contact part 18b formed at the bottom of the first interlocking lever 18. Above the first contact part 18b in the first interlocking lever 18 is integrally formed the convex part 18c projecting upwards, which can come into contact from below with the to-be-contacted part 19a formed on the second interlocking lever 19. The second interlocking lever 19 is supported in the support unit 3 to be turnable around the axis 19b, and the second hook part 19c integrally formed in the top portion of the second interlocking lever 19 is disposed in such a manner as to be able to be latched to the latch section 4a formed in the strobe casing 4. As shown in FIG. 10, when the pop-up manipulation member 21 is not pushed from outside, the first interlocking lever 18 and the second interlocking lever 19 are not lifted, and the second interlocking lever 19 is latched to the latch section 4a of the strobe casing 4 in an effort to keep the strobe casing 4 at the first position F. In this manner, the third engaging cam section 21c of the pop-up manipulation member 21 and the first and second interlocking levers 18, 19 which are linked with the cam together function as the third engaging section that keeps the strobe casing 4 at the first position F. Although it is not illustrated, there is an energizing spring acting as a bridge between the pop-up manipulation member 21 and the first interlocking lever 18, and through the energizing spring the pop-up manipulation member 21 is driven in the backward direction (direction E) and the first interlocking lever 18 is driven to set the first contact part 18b in the bottom side.

As shown in FIG. 10, the length of the portion to latch the fourth engaging section 21b of the pop-up manipulation member 21 to the second latch section 3f of the support unit 3 is designed to be comparatively large. As shown in FIG. 11, when the user lightly pushes the pop-up manipulation member 21 in the direction D, the third engaging cam section 21c of the pop-up manipulation member 21 makes the first interlocking lever 18 and the to-be-contacted part 19a of the second interlocking lever 19 be turned upwards, which makes the second hook part 19c of the second interlocking lever 19 be released from the latch section 4a of the strobe casing 4, whereas the fourth engaging section 21b of the pop-up manipulation member 21 is kept to be latched to the second latch section 3f formed on the support unit 3.

In the second embodiment, too, the wiring section 6 for electrically connecting the strobe light-emitting section 5 and the camera body 2 is sandwiched between the two plates 3a, 3b forming the support unit 3 so as not to be exposed outside when the strobe casing 4 is at the second position S away from the camera body 2.

In the camera 1 with a built-in strobe thus structured, when the pop-up manipulation member 21 is lightly pushed in the direction D, as described above with reference to FIG. 11 the fourth engaging section 21b of the pop-up manipulation member 21 remains to be latched to the second latch section 3f formed in the support unit 3; however, the second hook part 19c of the second interlocking lever 19 linked with the first interlocking lever 18 is released from the latch section 4a of the strobe casing 4.

Consequently, as shown in FIG. 12 the driving force of the second elastic member 10 enables only the strobe casing 4 to turn in the clockwise direction of the figure around the second turning section 12 with respect to the support unit 3, and the strobe casing 4 halts at the position (referred to as the third position B) where the strobe light-emitting section 5 faces diagonally upwards so as to make the strobe light-emitting section 5 ready for emission. Operating the strobe light-emitting section 5 ready for emission in an indoor space with a ceiling whose color is nearly white makes the light coming from the strobe light-emitting section 5 be reflected on the ceiling and others and then be emitted in the whole indoor space including not only the subject but also things behind the subject, thereby realizing so-called bounce photography.

In the structure of the camera 1 with a built-in strobe shown in the first embodiment, when the strobe light-emitting section 5 is used, not only the strobe casing 4 is turned with respect to the support unit 3 but also the support unit 3 is turned with respect to the camera body, and as shown in FIG. 4, the direction of the light axis of the lens contained in the lens barrel 14 and the direction of the light coming from the strobe light-emitting section 5 are designed to coincide with each other. Therefore, using the strobe light-emitting section 5 may cause the light to be strongly applied only on the frontward side of the subject and its very vicinity, and when there are a wall and things behind the subject, a shadow is formed behind the subject, making the picture unnatural.

In contrast, in the camera 1 with a built-in strobe of the second embodiment, the strobe casing 4 is set at the third position B shown in FIG. 12 so as to make the light of the strobe light-emitting section 5 be diffused by the ceiling or others and then be emitted in a wide range including the subject. This enables the subject to be irradiated not only the frontward side thereof but also the remaining part, and also things behind the subject to be irradiated entirely, thereby realizing excellent pictures.

In this state or in the state shown in FIG. 10, when the pop-up manipulation member 21 is strongly pushed, the fourth engaging section 21b of the pop-up manipulation member 21 is released from the second latch section 3f formed in the support unit 3. As a result, the driving force of the first elastic member 9 turns the support unit 3 around the first turning section 11 in the counterclockwise direction of the figure with respect to the camera body 2, and as shown in FIG. 13, the strobe casing 4 is projected upwards and forwards to reach the second position S and halts in the state where the strobe light-emitting section 5 faces straight ahead. The strobe light-emitting section 5 can emit light at the second position S.

When the user pushes the top surface of the strobe casing 4 towards the camera body 2 from the state of the second position S, the strobe casing 4 is shifted towards the camera body 2; the support unit 3 turns around the first turning section 11 in the clockwise direction of the figure with respect to the camera body 2 against the driving force of the first elastic member 9; and the strobe casing 4 turns around the second turning section 12 in the counterclockwise direction of the figure with respect to the support unit 3 against the driving force of the second elastic member 10. If the user further pushes the top surface of the strobe casing 4 downwards, the second hook part 19c of the second interlocking lever 19 is latched to the latch section 4a of the strobe casing 4; the fourth engaging section 21b of the pop-up manipulation member 21 is latched to the second latch section 3f of the support unit 3; and the strobe casing 4 reaches the first position F and is housed in the housing concave part 2c. Thus, the strobe casing 4 is set at the first position F and housed in the top-surface part of the camera body 2.

Thus, according to the camera 1 with a built-in strobe, the provision of the fourth engaging section 21b for engaging exclusively the support unit 3 at the first position F in addition to the third engaging cam section 21c and the first and second interlocking levers 18, 19 which together function as the third engaging section for engaging the strobe casing 4 at the first position F realizes so-called bounce photography, thereby producing excellent pictures. Furthermore, the function of the third engaging section is divided into the third engaging cam section 21c of the second interlocking lever 19, the first interlocking lever 18 built in the camera body 2, and the second interlocking lever 19 attached to the support unit 3, and these components are linked together to be latched to the latch section 4a of the strobe casing 4. This eliminates the need for the formation of the through hole in the support unit 3 to make the third engaging section 13 pass through it as in the first embodiment. In addition, the bounce photography can be realized by merely combining the function of the fourth engaging section 21b with the function of the third engaging section, which can minimize an increase in production cost.

Furthermore, the pop-up manipulation member 21 can be so designed as to have the function of engaging the strobe casing 4 at the first position F and also the function of engaging only the support unit 3 at the first position F, and can be operated while adjusting the amount of pushing (amount of shift) of the pop-up manipulation member 21. This facilitates the switching operation between the posture to shift the strobe casing 4 to the second position S and the posture to shift to the third position S, which enhances ease of use, thereby improving convenience. To be more specific, if the manipulation member to shift the strobe casing 4 to the second position S and the manipulation member to shift the strobe casing 4 to the third casing S are provided separately, it would be necessary to change the manipulating sites (manipulation members themselves) and to increase the number of components. The absence of these problems achieves convenience and a reduction in the number of components.

In the first embodiment, since the cover section 3c to cover the strobe light-emitting section 5 is made integral with the support unit 3, when applied on the cover section 3c, the logotypes of the product or components are divided by the camera body 2, thereby losing a sense of oneness, or are hidden behind the camera body 2 when the strobe casing 4 is set at the second position S. In comparison, in the camera 1 with a built-in strobe of the second embodiment, the cover section to cover the strobe light-emitting section 5 is fixed on the camera body 2 and is formed of the front-surface part 2d of the camera body 2 in the second embodiment. Therefore, the logotype applied on this spot is never separated from or hidden behind the camera body 2, thereby maintaining excellent viewability.

Embodiment 3

Figure 14:
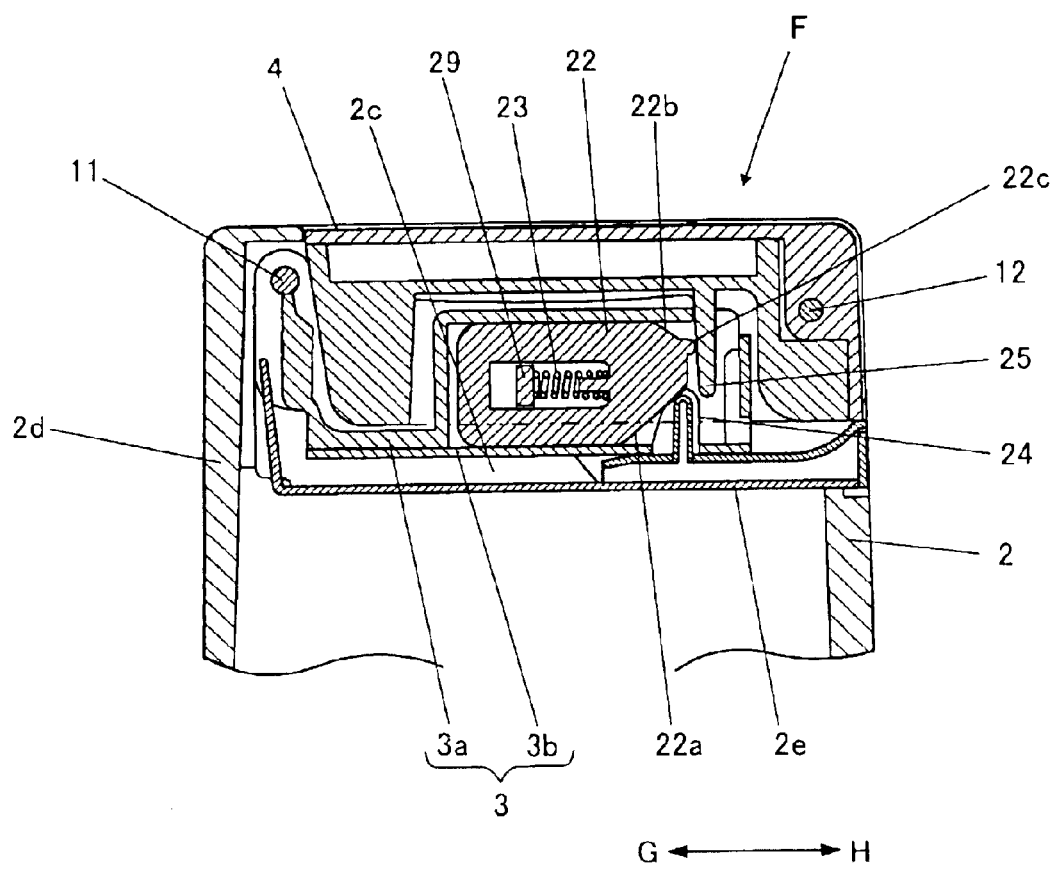
FIG. 14 is an enlarged view of a main part of a camera with a built-in strobe at a first position according to a third embodiment of the present invention.
Figure 15:
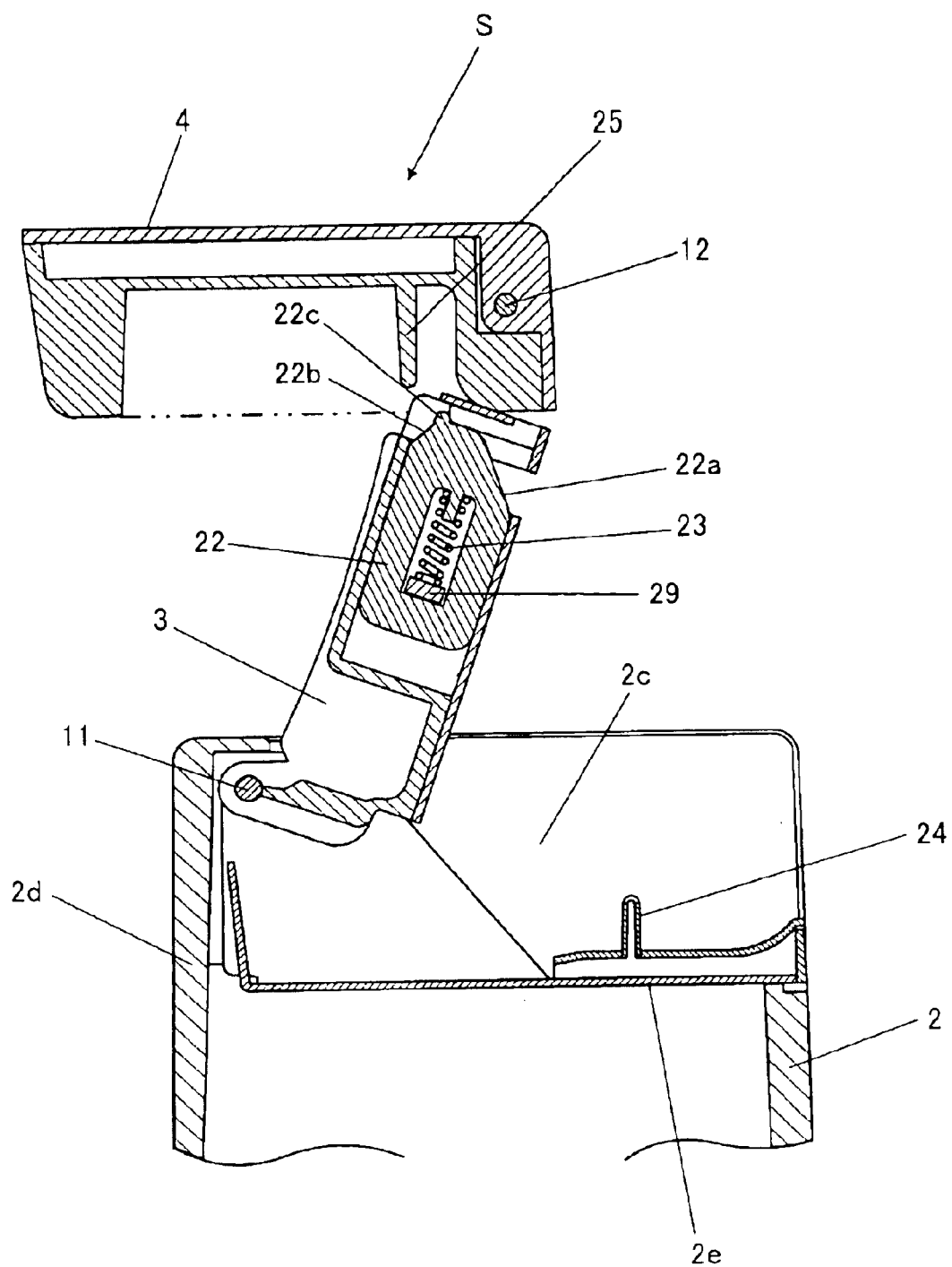
FIG. 15 is an enlarged view of the main part of the camera with a built-in strobe at a second position according to the third embodiment of the present invention.
Figure 16:
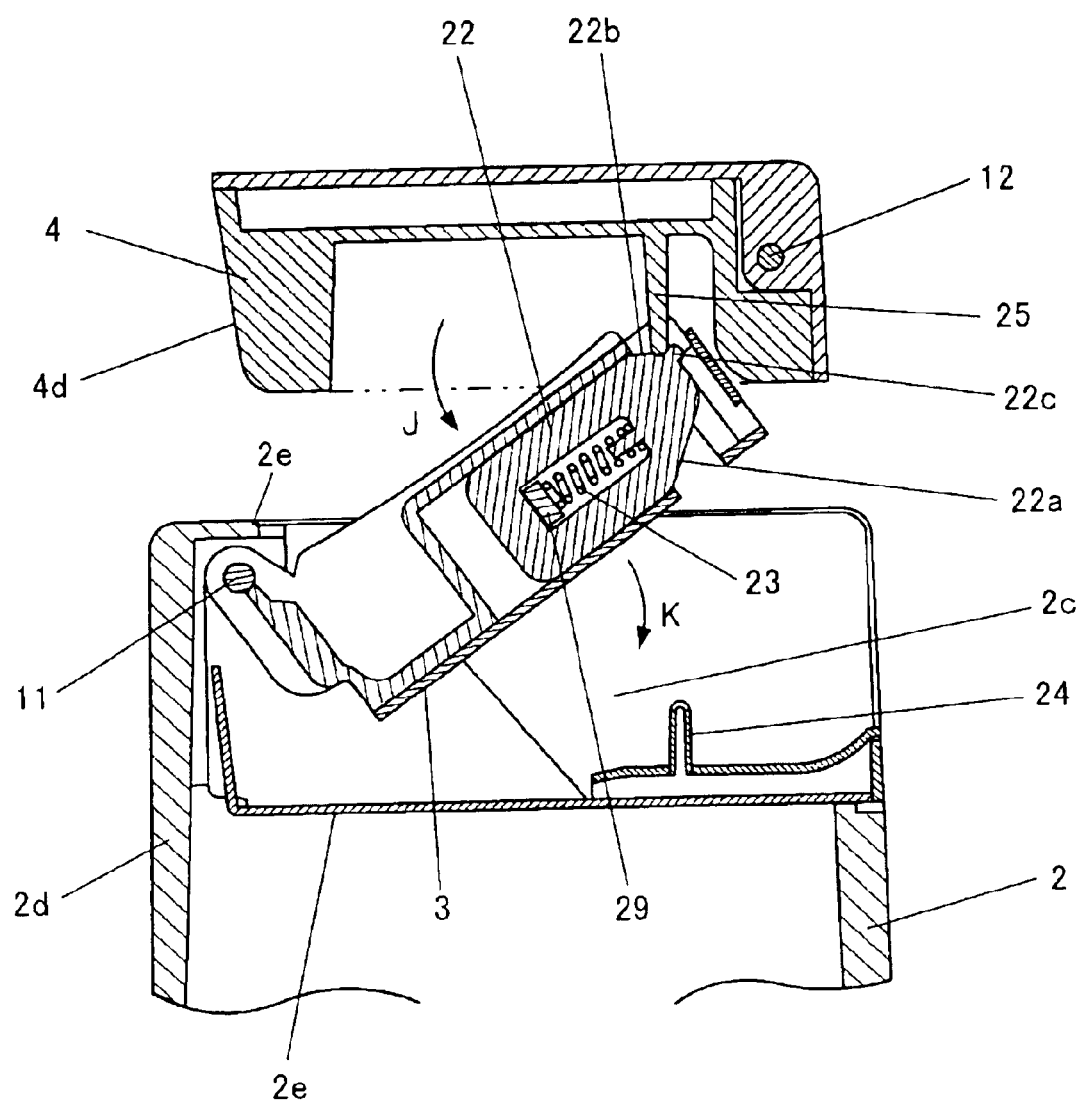
FIG. 16 is an enlarged view of the main part of the camera with a built-in strobe when shifting from the second position to the first position according to the third embodiment of the present invention.
Figure 17:
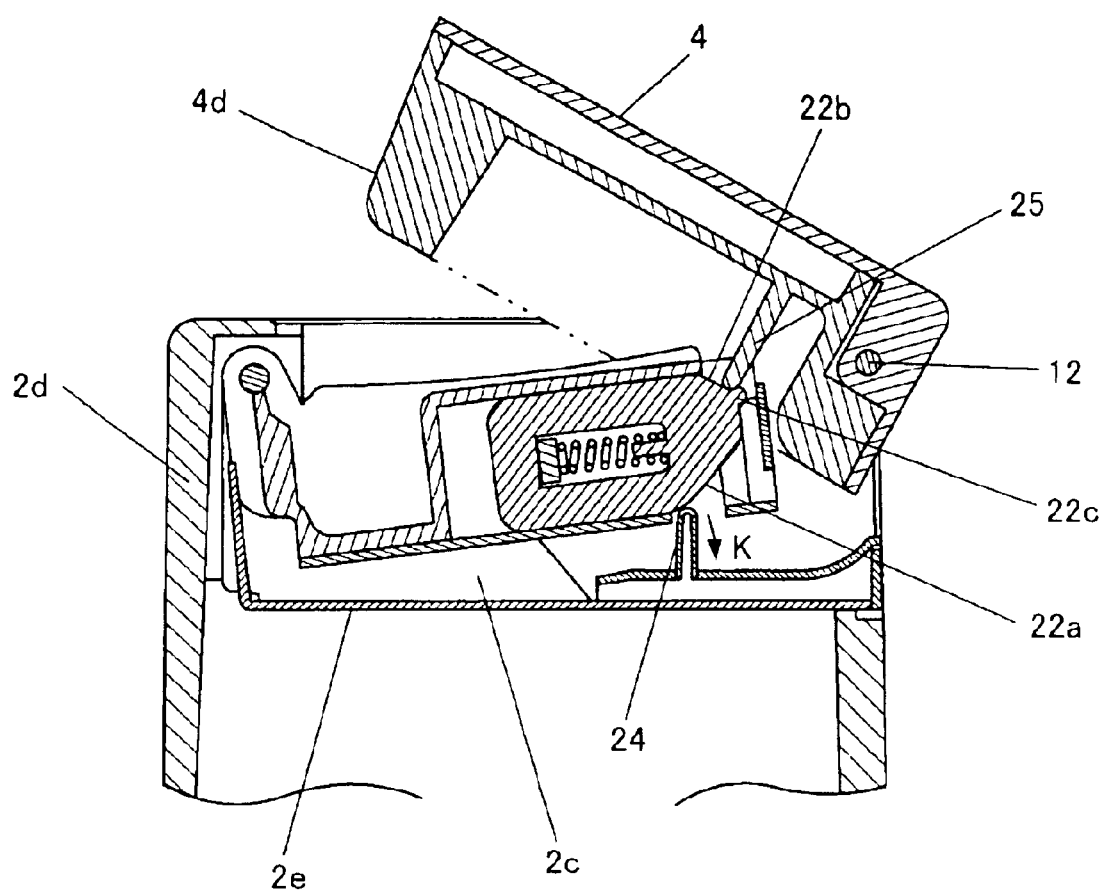
FIG. 17 is an enlarged view of the main part of the camera with a built-in strobe when shifting from the second position to the first position according to the third embodiment of the present invention.
Figure 18:
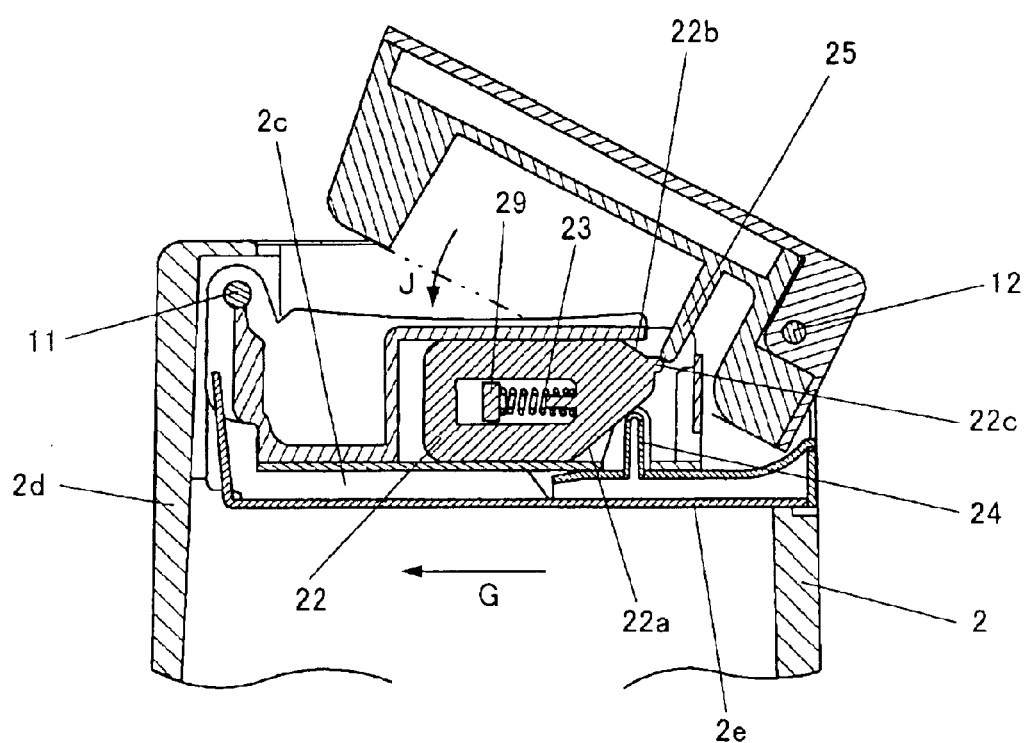
FIG. 18 is an enlarged view of the main part of the camera with a built-in strobe when shifting from the second position to the first position according to the third embodiment of the present invention.
Figure 19A:
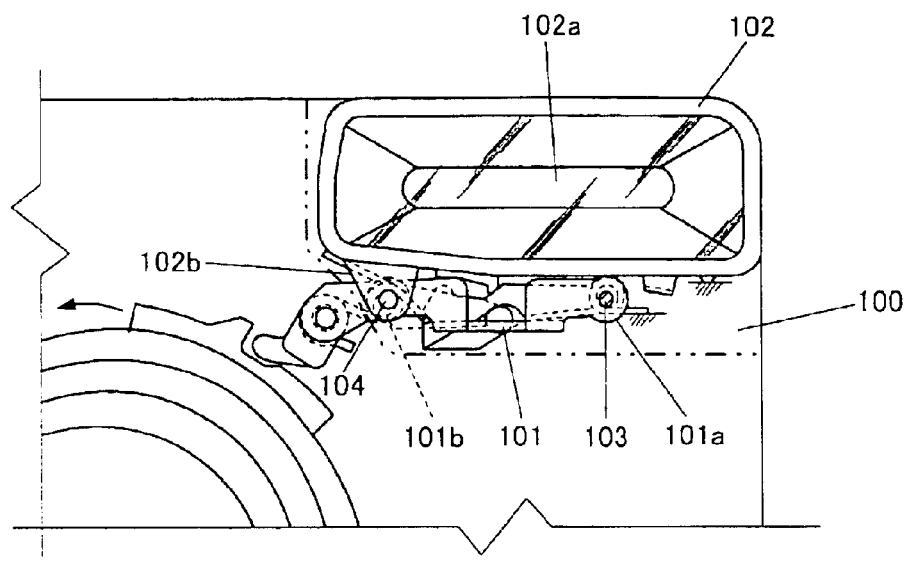
Figure 19B:
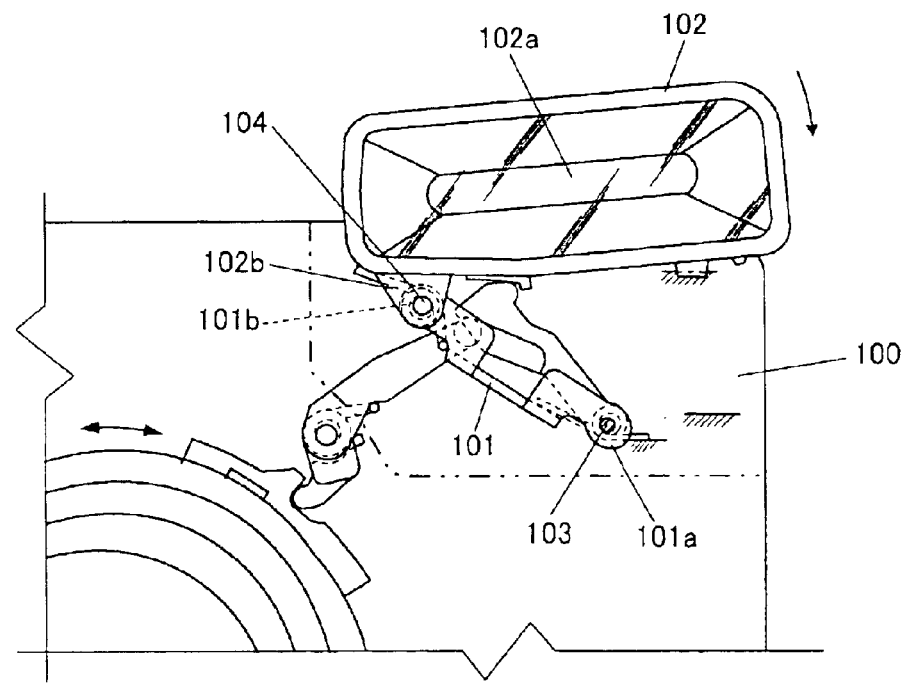
Figure 20:
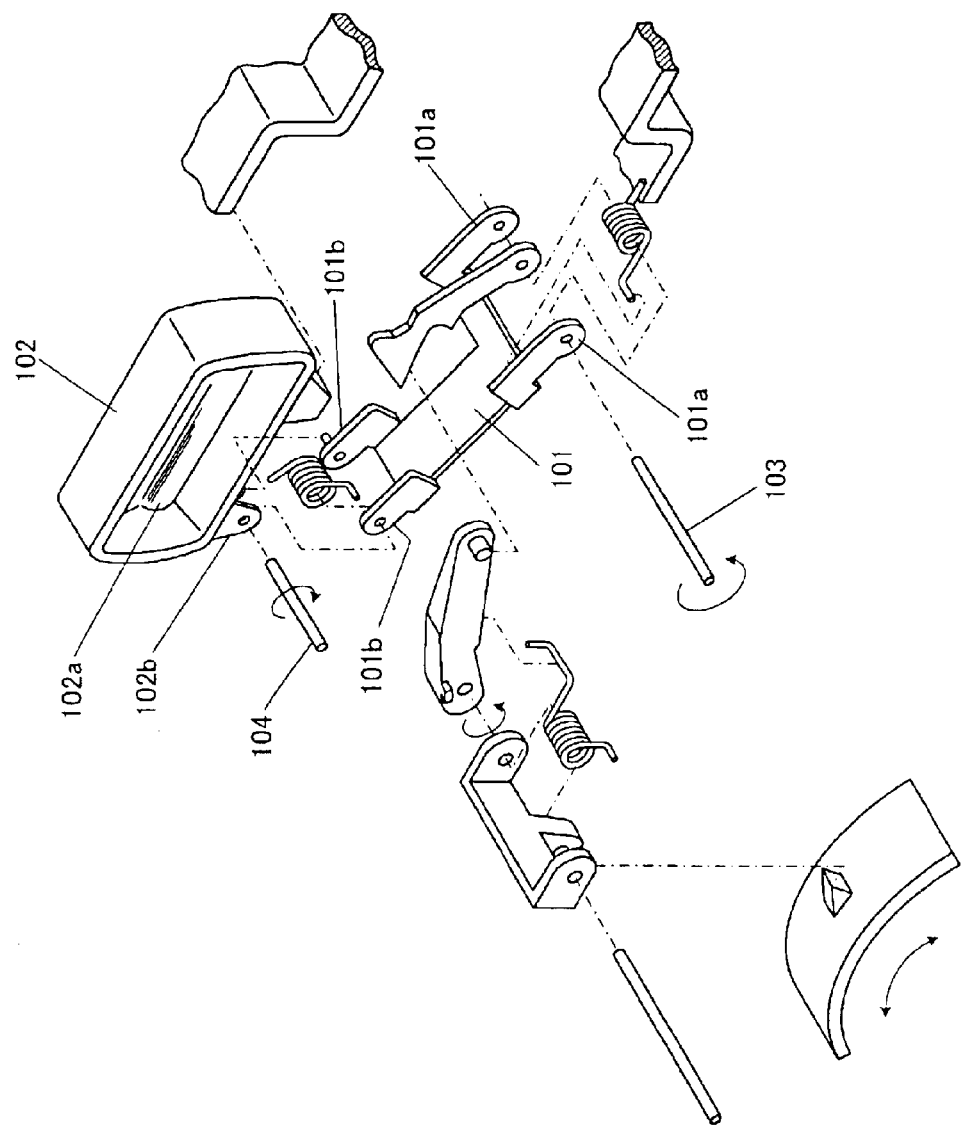
FIG. 20 is an exploded perspective view of the main part of the conventional camera with a built-in strobe.
Figure 21:
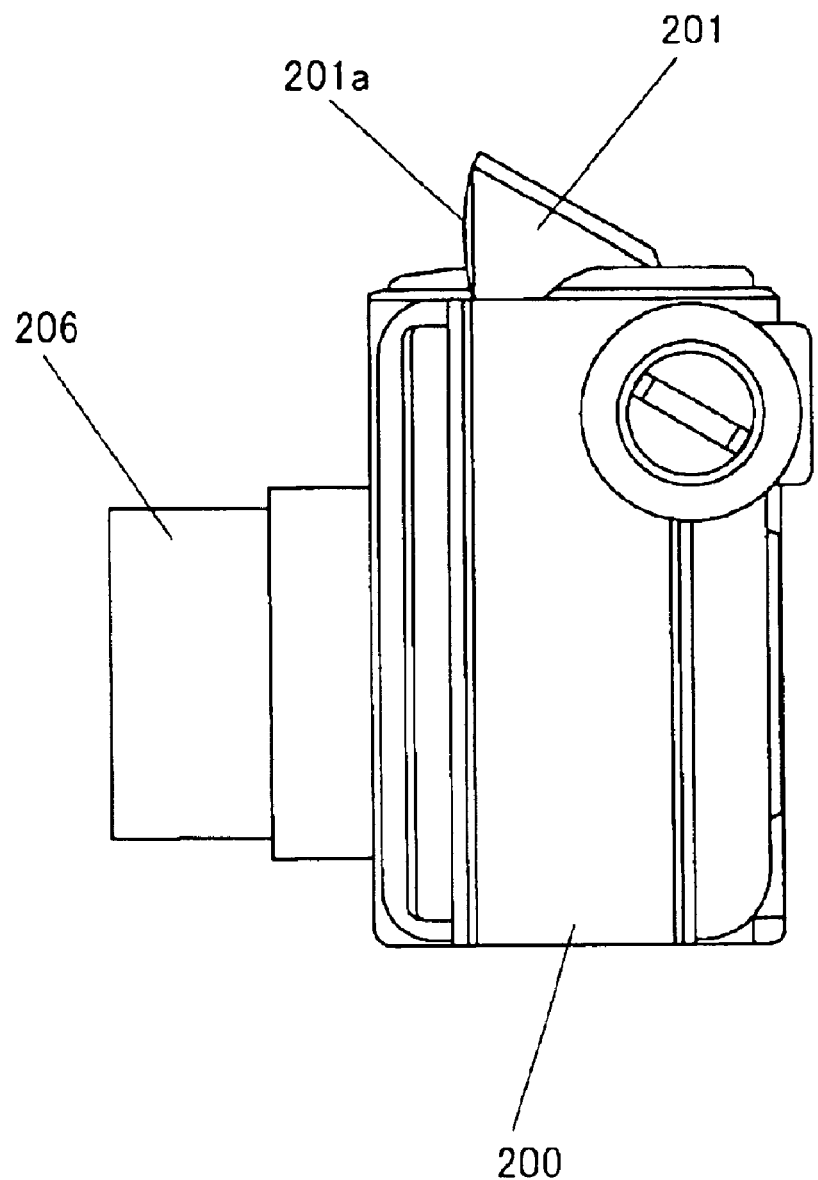
FIG. 21 is a side view of another conventional camera with a built-in strobe.
Figure 22A:
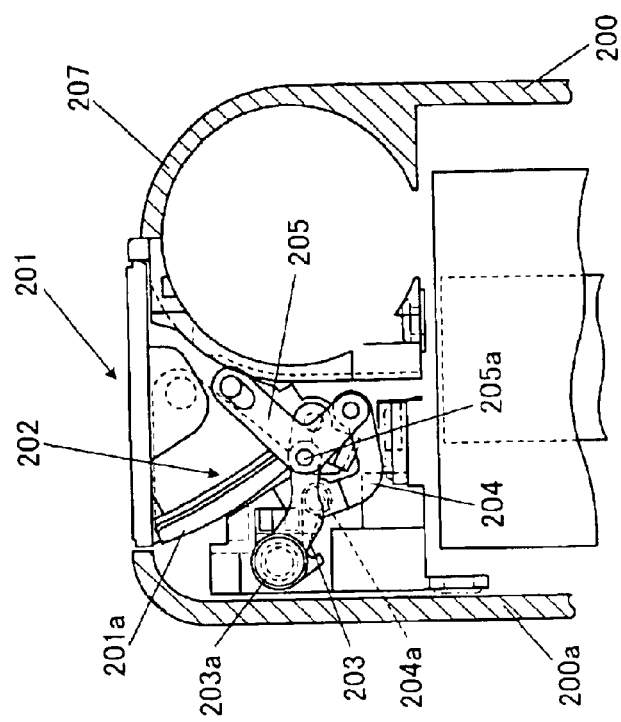
Figure 22B:
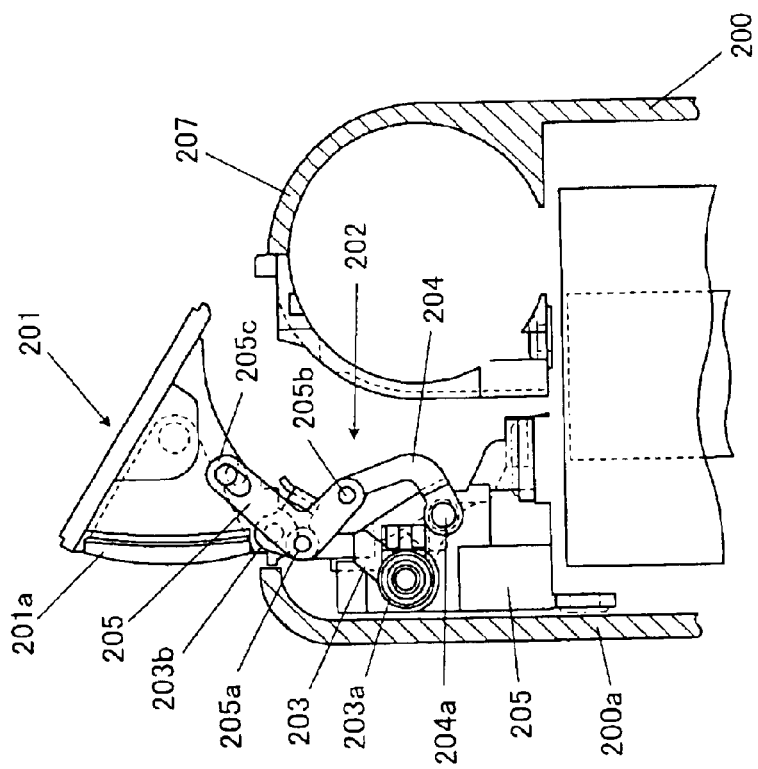

FIGS. 14 to 18 are enlarged cross sectional views of the main part of a camera with a built-in strobe in a third embodiment of the present invention. FIG. 14 shows a state where the strobe casing 4 is at the first position F, FIG. 15 shows a state where the strobe casing 4 is at the second position S, and FIGS. 16 to 18 show a state where the strobe casing 4 is shifted from the second position S to the first position F. The components having the same functions as those in the aforementioned embodiments are referred to with the same symbols.

As shown in FIGS. 14 to 18, the camera 1 with a built-in strobe has the structure shown in the second embodiment and further has a restriction mechanism (restrictor) to restrict the turning of the strobe casing 4 towards the first position F with respect to the support unit 3. At the first position F, the front surface of the strobe casing 4 is covered by the front surface part 2d of the camera body 2 which functions as the cover section.

In the structure like the camera 1 with a built-in strobe of the second embodiment where the portion to function as the cover section of the strobe casing 4 is fixed on the camera body 2 and when shifted from the second position S to the first position F, the strobe casing 4 can be turned around the second turning section 12, the front end part of the strobe casing 4 may come into contact with the rear portion on the top end of the front-surface part forming the wall of the housing concave part 2c of the camera body 2.

In order to cope with this problem, the camera with a built-in strobe of the third embodiment is provided with a restriction mechanism (restrictor) which restricts the turning of the strobe casing 4 to the first position side with respect to the support unit 3 within the prescribed turning range of the support unit 3 with respect to the camera body 2 when the strobe casing 4 is shifted from the second position S to the first position F.

To be more specific, at the position in the vicinity of the side-surface part of the support unit 3 is provided a slide member 22 which can slide in the directions G and H within the support unit 3, and in the slide member 22 are provided an energizing spring 23 which drives the slide member 22 in the direction H and a stopper 29 which restricts the movement of the slide member 22 and holds one end of the energizing spring 23. At one end of the slide member 22 are formed a first inclined surface 22a which can be in contact with the first protruding part 24 which protrudes upwards from the bottom surface side of the housing concave part 2c; a second inclined surface 22b which can be in contact with the second protruding part 25 which protrudes towards the support unit 3 side from inside the strobe casing 4; and a third protruding part 22c which is formed contiguously with the second inclined surface 22b. As shown in FIG. 14, when the strobe casing 4 is at the first position F, the third protruding part 22c of the slide member 22 comes into contact with a side of the second protruding part 25 of the strobe casing 4, and the first inclined surface 22a of the slide member 22 is in contact with the first projecting part 24.

As shown in FIG. 15, when it is at the second position S, the strobe casing 4 is detached from the housing concave part 2c of the camera body 2, so the slide member 22 is separated from the first protruding part 24 and the second protruding part 25.

The strobe casing 4 is returned from the second position S to the first position F in the following manner.

First, when the strobe casing 4 starts to be pushed towards the camera body 2 side from the second position S, as shown in FIG. 16, the tip of the second protruding part 25 of the strobe casing 4 comes into contact with the portion which leads to the third protruding part 22c from the second inclined surface 22b of the slide member 22. Before the second protruding part 25 comes into contact with the slide member 22, the strobe casing 4 can be freely turned to the first position F side (approaching side) with respect to the support unit 3.

However, when the strobe casing 4 is further pushed towards the camera body 2 side from the state shown in FIG. 16, the tip of the second protruding part 25 of the strobe casing 4 comes into contact with the second inclined surface 22b of the slide member 22 and the third protruding part 22c and is locked therebetween. This prevents the strobe casing 4 from turning in the direction to approach to the support unit 3 (the direction J around the second turning section 12), and allows the support unit 3 to turn only in the direction K towards the inside of the housing concave part 2c of the camera body 2. Consequently, in the state where the end part 4d of the strobe casing 4 is close to the rear surface portion 2e on the top end of the front-surface part forming the wall of the housing concave part 2c of the camera body 2, the turning of the strobe casing 4 with respect to the support unit 3 is restricted and the front end part of the strobe casing 4 is prevented from coming into contact with the rear surface portion 2e of the camera body 2.

After this, when the strobe casing 4 is further pushed towards the camera body 2 side and the support unit 3 is put into the housing concave part 2c of the camera body 2 as shown in FIG. 17, the first inclined surface 22a of the slide member 22 comes into contact with the first protruding part 24. And when the strobe casing 4 is further pushed towards the camera body 2 side, the slide member 22 is pushed and slid in the direction G by the first protruding part 24 in contact with the first inclined surface 22a of the slide member 22. As a result, the tip of the second protruding part 25 of the strobe casing 4 is detached from the portion which leads from the second inclined surface 22b of the slide part 22 to the third protruding part 22c. Hence, the strobe casing 4 is released from the locked state to be turned in the direction J towards the first position F, thereby being set at the first position F and housed therein without any trouble.

According to this structure, in the case where the cover section is fixed on the camera body 2 side by providing the front surface part 2d of the camera body 2 with the function of a cover section, the strobe casing 4 can be prevented from being damaged by coming into contact with the front surface part 2d functioning as the cover section while the strobe casing 4 is shifted from the second position S to the first position F.

According to this structure, the cover section, which is integrated with the camera body 2, makes the strobe casing 4 unobtrusive and simple in design when housed at the first position F.

The second and third embodiments describe the example where at the first position F, the strobe casing 4 is housed in the housing concave part 2c formed in the top part of the camera body 2. Instead of this structure, it is also possible that the cover section is fixed on the camera body 2 in such a manner as to project upwards from the top surface of the camera body 2, and that the strobe casing 4 and the support unit 3 are housed behind the cover section.

What is claimed is:

1. A camera with a built-in strobe, comprising:

a camera body;

a support unit having a first turning section and a second turning section, the support unit being turnably supported on the camera body through the first turning section;

a strobe casing turnably supported at one side thereof on the support unit through the second turning section, the strobe casing comprising a strobe light-emitting section and being shiftable between a first position and a second position;

a first engaging section for engaging the support unit at the second position; and a second engaging section for engaging the strobe casing at the second position, wherein the strobe casing is approximately rectangular parallelepiped in shape, and the support unit covers side surfaces and a bottom surface of the strobe casing when the strobe casing is at the first position.

2. A camera with a built-in strobe, comprising:

a camera body;

a support unit having a first turning section and a second turning section, the support unit being turnably supported on the camera body through the first turning section;

a strobe casing turnably supported at one side thereof on the support unit through the second turning section, the strobe casing comprising a strobe light-emitting section and being shiftable between a first position and a second position;

a first engaging section for engaging the support unit at the second position; and a second engaging section for engaging the strobe casing at the second position, wherein the support unit comprises two plates overlaid one on the other, and a wiring section for electrically connecting the strobe light-emitting section and the camera body, said wiring section being sandwiched between the two plates.

3. A camera with a built-in strobe, comprising:

a camera body;

a support unit having a first turning section and a second turning section, the support unit being turnably supported on the camera body through the first turning section;

a strobe casing turnably supported at one side thereof on the support unit through the second turning section, the strobe casing comprising a strobe light-emitting section and being shiftable between a first position and a second position;

a first engaging section for engaging the support unit at the second position;

a second engaging section for engaging the strobe casing at the second position;

a first elastic member for driving the support unit to the second position with respect to the camera body;

a second elastic member for driving the strobe casing to the second position with respect to the support unit; and a third engaging section for engaging the strobe casing at the first position.

4. The camera with a built-in strobe, according to claim 3, further comprising a fourth engaging section for exclusively engaging the support unit at the first position.

5. The camera with a built-in strobe, according to claim 3, further comprising:

a pop-up manipulation member attached to the camera body; a fourth engaging section for exclusively engaging the support unit at the first position, wherein the third engaging section and the fourth engaging section are located in said pop-up manipulation member, and the pop-up manipulation member is for being manipulated when the strobe casing is at the first position to distinguish between an operation of shifting the strobe casing and the support unit to the second position and an operation of shifting only the strobe casing from the first position to the second position.

6. The camera with a built-in strobe, according to claim 5, further comprising a member linked with the pop-up manipulation member, wherein the third engaging section and the fourth engaging section are located in said member.

* * * * *